(12) United States Patent
Miyahisa et al.

(10) Patent No.: US 8,057,933 B2
(45) Date of Patent: Nov. 15, 2011

(54) SAFETY MECHANISM FOR LAMINATE BATTERY

(75) Inventors: Masaharu Miyahisa, Osaka (JP); Yoshiki Ohsawa, Osaka (JP); Tsuyoshi Hatanaka, Wakayama (JP); Yasuhiko Yamasaki, Wakayama (JP)

(73) Assignee: Panasonic Corporation, Osaka (JP)

( * ) Notice: Subject to any disclaimer, the term of this patent is extended or adjusted under 35 U.S.C. 154(b) by 169 days.

(21) Appl. No.: 11/915,356

(22) PCT Filed: May 18, 2006

(86) PCT No.: PCT/JP2006/309937
§ 371 (c)(1),
(2), (4) Date: Jan. 22, 2008

(87) PCT Pub. No.: WO2006/126446
PCT Pub. Date: Nov. 30, 2006

(65) Prior Publication Data
US 2009/0017365 A1    Jan. 15, 2009

(30) Foreign Application Priority Data

| May 23, 2005 | (JP) | 2005-149881 |
| Nov. 2, 2005 | (JP) | 2005-319295 |
| Nov. 11, 2005 | (JP) | 2005-327110 |
| Feb. 3, 2006 | (JP) | 2006-027141 |

(51) Int. Cl.
*H01M 2/08* (2006.01)
*H01M 2/12* (2006.01)

(52) U.S. Cl. ............ 429/185; 429/53; 429/54; 429/57; 429/138; 429/163; 429/180

(58) Field of Classification Search .......... 429/51, 429/138, 151, 163, 180, 53, 54, 185
See application file for complete search history.

(56) References Cited

U.S. PATENT DOCUMENTS

| 3,991,255 A * | 11/1976 | Blaskiewicz et al. ...... 428/424.8 |
| 5,521,021 A * | 5/1996 | Alexandres et al. ............ 429/54 |
| 6,265,098 B1 * | 7/2001 | Audit et al. .................... 429/94 |
| 6,958,200 B2 * | 10/2005 | Kato et al. .................... 429/223 |
| 2004/0058233 A1 * | 3/2004 | Hamada et al. ............... 429/159 |
| 2005/0042511 A1 | 2/2005 | Kaneta |
| 2005/0069759 A1 * | 3/2005 | Shimamura et al. ............ 429/53 |
| 2005/0158622 A1 * | 7/2005 | Mizuta et al. ................. 429/185 |
| 2006/0093895 A1 | 5/2006 | Lim |

FOREIGN PATENT DOCUMENTS

| CN | 1211343 | 3/1999 |
| JP | 61-114464 | 6/1986 |
| JP | 62-100939 | 5/1987 |
| JP | 62-147652 | 7/1987 |
| JP | 62-217572 | 9/1987 |
| JP | 01-221855 | 9/1989 |
| JP | 03-082559 | 4/1991 |
| JP | 3-82559 | 8/1991 |
| JP | 05-129009 | 5/1993 |
| JP | 05-190164 | 7/1993 |
| JP | 11-086823 | 3/1999 |
| JP | 11-097070 | 4/1999 |
| JP | 2001-093489 | 4/2001 |
| JP | 2001-325926 | 11/2001 |
| JP | 2004-014125 | 1/2004 |
| JP | 2005-122927 | 5/2005 |
| JP | 2005-203262 | 7/2005 |
| WO | WO 2005/122294 A1 | 12/2005 |

OTHER PUBLICATIONS

European Search Report issued in European Patent Application No. 06746612.8-1227, mailed Dec. 3, 2009.
Chinese Office Action issued in Chinese Patent Application No. 200680018159, mailed Oct. 16, 2009.

* cited by examiner

*Primary Examiner* — Patrick Ryan
*Assistant Examiner* — Laden Mohaddes
(74) *Attorney, Agent, or Firm* — McDermott Will & Emery LLP

(57) ABSTRACT

A safety mechanism for a laminate battery. An exterior case (5) consists of two molded sheets (5a) made of laminate sheets, superposed upon one another, and bonded together around the outer edges. The exterior case has a protrusion (10) that communicates with the interior of the exterior case and protrudes outwardly from one side. A safety vent (13) is made up of an exhaust hole (11) formed in at lease one of the two molded sheets (5a) in the protrusion (10), and a valve element (12) making elastic pressure contact with the edge of the exhaust hole (11) to seal it. The safety mechanism does not operate within the range of internal pressure variation during normal use, but operates reliably at a time point when a predetermined valve operating pressure is reached to release a necessary amount of gas to the outside, this valve operating pressure being within the safe range relative to the pressure resistance of the exterior case (5) made of laminate sheets. Also, the safety vent configuration enables a reduction in production cost.

20 Claims, 12 Drawing Sheets

Prior Art
Fig. 17A
Fig. 17B
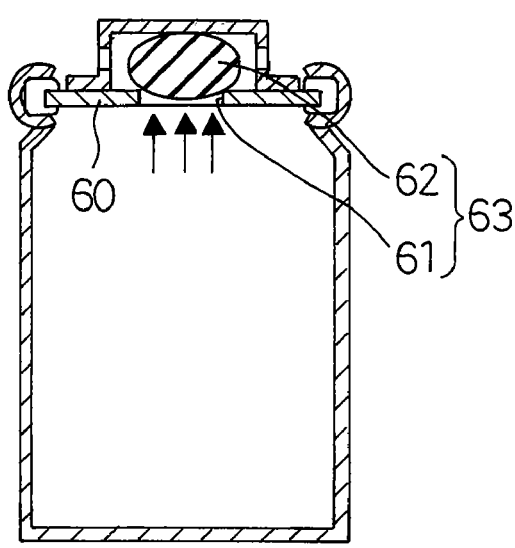
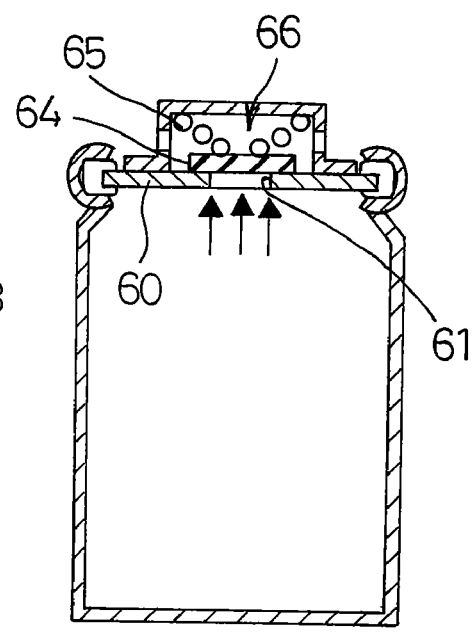

SAFETY MECHANISM FOR LAMINATE BATTERY

RELATED APPLICATIONS

This application is the U.S. National Phase under 35 U.S.C. §371 of International Application No. PCT/JP2006/309937 filed on May 18, 2006, which in turn claims the benefit of Japanese Patent Application No. 2005-149881, filed on May 23, 2005, Japanese Patent Application No. 2005-319295, filed on Nov. 2, 2005, Japanese Patent Application No. 2005-327110, filed on Nov. 11, 2005,and Japanese Patent Application No. 2006-027141, filed on Feb. 3, 2006, the disclosures of which Applications are incorporated by reference herein.

TECHNICAL FIELD

The present invention relates to a safety mechanism for a laminate battery in which an electrode plate group and an electrolyte are encased in an exterior case made of laminate sheets, the safety mechanism being provided for releasing generated gas to the outside when an internal pressure of the battery rises to a predetermined level.

BACKGROUND ART

Conventionally, lithium ion batteries and the like are commonly configured as a laminate battery which is composed of an electrode plate group and an electrolyte encased in an exterior case made of laminate sheets. Lithium ion batteries which have metal battery cases are generally provided with a safety vent that opens part of the battery case to the outside so as to release internal gas smoothly to the outside when the temperature or internal pressure of the battery exceeds a predetermined level, in order to prevent rupture of the battery which results from a battery temperature rise and a subsequent rapid pressure build-up. There are usually two types of safety vents: Heat shut-off type and rupture membrane type. Most batteries adopt one of them, and some use both of them.

Some cylindrical batteries that use the above metal battery case include a built-in resealable safety vent. For example, a known resealable safety vent 63 shown in FIG. 17A includes an exhaust hole 61 provided in a sealing plate 60 and a rubber valve element 62 that seals the exhaust hole 61 by making pressure contact with the periphery of the hole 61. Another known resealable safety vent 66 shown in FIG. 17B includes an exhaust hole 61 similarly to the above, a rubber-lined valve element 64, and a spring 65 that applies a force in a direction in which the valve element 64 is pressed against the periphery of the exhaust hole 61 to seal the hole 61. Such resealable safety vents 63 and 66 cannot be applied to laminate batteries. Application of such vents to laminate batteries is unthinkable because of large functional difference, and of the inevitable large difference in configuration, between the laminate sheet exterior case of the laminate battery and the metal battery case.

In laminate batteries, usually, the laminate sheets that form the exterior case are made of polypropylene (hereinafter, abbreviated as "PP") and bonded together by heat sealing. Since the melting temperature of PP is approximately 150° C., the laminate sheet melts and releases internal gas to the outside to lower the pressure when the battery temperature exceeds 150° C., thereby preventing a rupture accident. A safety vent configuration commonly adopted in laminate batteries uses plastic that has a lower melting point than PP and is inexpensive as much as possible, for example polyethylene (hereinafter, abbreviated as "PE"); the plastic is interposed in between the bonded part, so that this portion will melt first to open the vent when the battery heats up (see, for example, Patent Document 1).

Another known safety vent configuration for laminate batteries provides a portion where the peeling strength is reduced by making the width of the heat-sealed part narrower, so that this portion will function as a safety vent (see, for example, Patent Document 2).

Yet another known safety vent configuration for laminate batteries provides a portion in the sealed part where the pressure resistance (peeling strength) is reduced by making smaller the thickness of part of the adhesive layer or heat-sealed plastic layer of the sealed part, or by implanting a different material film or a hollow component, so that this portion will function as a safety vent (see, for example, Patent Document 3).

[Patent Document 1] Patent Laid-Open Publication No. 2001-93489

[Patent Document 2] Patent No. 3554155

[Patent Document 3] Patent Laid-Open Publication No. 11-86823

DISCLOSURE OF THE INVENTION

Problems to be Solved by the Invention

With the safety vent configuration that uses low melting point plastics as the one disclosed in Patent Document 1, even when the internal pressure of the battery rises, if the temperature is low, the plastic will not melt and the generated gas cannot be released to the outside. In such a safety vent, if short circuit occurs in a place far away from the position where the safety vent is provided and heat is generated, the heat will melt the short-circuited point and the heat-sealed part in the vicinity, while the safety vent itself will not be activated, resulting in a situation where gas escapes from a wrong point and not from where the safety vent is provided. This tendency is evident in large batteries.

With the safety vent configurations disclosed in Patent Document 2 or 3, in which the sealed part is provided with a portion where the peeling strength is reduced, the safety vent is opened by plastic deformation induced by gas pressure. That is, the safety vent is activated irrespective of the battery temperature and only by rising internal pressure of the exterior case. The valve operating pressure, however, is actually imprecise, unstable, poorly reproducible, and hence unreliable in respect of safety. Also, in laminate batteries, a so-called creep phenomenon may occur irregularly, in which the heat-sealed part is gradually peeled away by a force that is created when the internal pressure builds up and distends the battery, and because of this, the reproducibility of the valve operating pressure is largely reduced with aging.

Exterior cases of laminate batteries, incidentally, have a low pressure resistance of about 1 MPa as compared to metal battery cases. The internal pressure could rise to as high as 0.3 MPa during charging or discharging even in normal use condition and the safety vent should preferably be actuated at about 0.4 to 0.7 MPa, more preferably at about 0.5 MPa. The tolerance range of variation in valve operating pressure must be about ±0.05 MPa. Accordingly, it is desirable to provide a safety vent for laminate batteries that can operate at the above low pressure with high precision and that have a low-cost configuration.

To satisfy these requirements, many of the pressure-activated safety vents for laminate batteries adopt a configuration that uses a rupture membrane. However, it is difficult to bond the rupture membrane to the laminate sheet by heat sealing, and to make the rupture membrane operate precisely at lower pressure, high processing precision is required, which in turn increases cost.

The resealable safety vents 63 and 66 shown in FIG. 17A and FIG. 17B are usually activated at a high pressure of about 2.2 to 2.3 MPa with a large range of variation in valve operating pressure being ±0.5 MPa, and therefore cannot possibly be applied to laminate batteries.

The present invention was devised in view of the problems in the conventional techniques described above, and an object thereof is to provide a safety mechanism for laminate batteries that does not operate within the variation range of internal pressure during normal use while being capable of operating reliably to release a necessary amount of gas to the outside at a time point when a predetermined valve operating pressure is reached, which pressure is within the safe range of pressure relative to the pressure resistance of the exterior case made of laminate sheets; the safety mechanism also has a configuration that enables a reduction in production cost.

Means for Solving the Problems

To achieve the above object, the present invention provides a safety mechanism for a laminate battery, the battery including power generation elements and an electrolyte accommodated in an exterior case, the exterior case being formed by superposing two molded sheets made of laminate sheets upon one another and bonding them together around outer edges, wherein the exterior case is provided with a projection that communicates with an internal space of the exterior case and protrudes outwardly from one side of the exterior case; and wherein the safety mechanism includes a safety vent having an exhaust hole formed in at least one of the two molded sheets in the protrusion, and a valve element that seals the exhaust hole by making elastic pressure contact with a hole edge of the exhaust hole.

With this safety mechanism for laminate batteries, the pressure of gas acts not only on the portion of the valve element directly opposite the exhaust hole, but also on its entire end surface through the molded sheet around the edge of the exhaust hole, and therefore, the safety vent operates at relatively low pressure. Moreover, variation in the valve operating pressure is small, i.e., high precision is achieved in the valve operating pressure. Accordingly, the safety vent does not operate within the variation range of internal pressure during normal use, while being capable of operating reliably at the predetermined valve operating pressure to release the generated gas, this pressure being set within the safe pressure range relative to the strength of the exterior case that is made of laminate sheets. Since the gas is exhausted exclusively from the portion where the safety vent is provided, an abnormality is reliably discovered by detecting the release of gas, which enables correct determination as to which batteries are not usable as the power source.

In the above safety mechanism for laminate batteries, the exhaust hole is preferably positioned such that a distance between the exhaust hole and an inner edge of the bonded part of the protrusion on the protruded side is 1.5 mm or less, and preferably 1.0 mm or less.

With this configuration, when the internal pressure of the laminate battery rises to the valve operating level, the generated gas almost cannot penetrate into the narrow portion of 1.5 mm or less between the exhaust hole and the bonded part of the protrusion on the protruded side, because of which the expansive deformation induced by the gas pressure of the molded sheet having the exhaust hole occurs only around the exhaust hole except for the side of the protrusion. Thereby, the molded sheet having the exhaust hole is bulged outwards because of the gas pressure concentrating locally on the portion near the exhaust hole opposite from the side of the protrusion, because of which the valve element is tilted by the deforming force of the molded sheet with its protruding end of the protrusion acting as fulcrum, whereby an exhaust route is reliably secured for the generated gas. Accordingly, the safety vent is actuated precisely and reliably when the predetermined valve operating pressure is reached.

Forming the valve element in the above safety mechanism for laminate batteries from an elastic material provides the merit of reducing the number of components and making the configuration simple, because an elastic valve element can be compressed so that it can make pressure contact with the hole edge of the exhaust hole by its compression reaction force.

Also, with the valve element being made of an elastic material having rubber elasticity, the valve element can deform such that the portion opposite the hole edge of the exhaust hole in the molded sheet is tilted, whereby variation in the valve operating pressure can be made smaller and the valve operating pressure can be provided with high precision.

As the material having rubber elasticity, EPDM can be preferably used for the valve element, because EPDM has low water permeability and good chemical resistance and it does not swell even in an electrolyte.

As the material having rubber elasticity, an EPDM/urethane double layer can also be used. With a valve element made of such double layer elastic material, both of the low water permeability and good chemical resistance of EPDM and the low softening temperature of urethane can be used; the vent can be actuated by high temperature when the temperature is higher than 80° C. before the valve operating pressure is reached, and when the temperature is lower than 80° C., the vent can be actuated by the pressure reaching the predetermined level.

With the valve element in the above safety mechanism for laminate batteries being set in a compressed state with a compression ratio of 25% or less, permanent distortion in the elastic valve element is restricted, whereby it is ensured that the safety vent can operate stably for a long period of time without variation in the valve operating pressure.

The safety vent in the above safety mechanism for laminate batteries is configured to be resealable, in which the valve element, making elastic pressure contact with the hole edge of the exhaust hole in the projection of the molded sheet to seal the exhaust hole, is elastically deformed when the internal pressure of the laminate battery rises to a predetermined level, thereby opening the vent, and after that, when the internal pressure lowers to a predetermined level, the valve element can return to the initial shape, thereby closing the vent. When the internal pressure build-up is a temporary one, the safety vent closes again after a necessary amount of gas has been released, so that the battery can be used further. Accordingly, in an application where a plurality of laminate batteries are connected in series and used as the power source of an appliance, a temporary rise in the internal pressure of some batteries will not disable the entire battery power source.

The resealable safety vent in the above safety mechanism for laminate batteries is configured to operate at a valve operating pressure of 0.4 to 0.7 MPa, this valve operating pressure being reproducible with the tolerance range of variation in valve operating pressure being ±0.05 MPa. Thus, while the safety vent does not operate within the normal range of pressure variation up to 0.3 MPa in the laminate battery, it will operate reliably before the pressure in the laminate battery rises to 1.0 MPa, which is the pressure resistance of the exterior case, whereby safety is reliably secured.

The safety vent in the above safety mechanism for laminate batteries is configured such that the exhaust hole is formed in the protrusion in both of the two molded sheets at matching positions, and the pair of exhaust holes are respectively sealed with valve elements making pressure contact with their hole edges; thus a pair of safety vents are provided. With this configuration, the safety vents can be produced through a process step of forming the pair of exhaust holes at the same time by punching out holes in the pair of molded sheets at the predetermined position in the protrusion of the laminate battery using, for example, a punch and a die set, after finishing production of the laminate battery. There would be no need of closing the exhaust hole with a rubber plug in the process of injecting electrolyte or of using specially designed tools for handling the exterior case as would be necessary for the safety mechanism having an exhaust hole provided in only one molded sheet, and thereby, production cost can be reduced.

In the above safety mechanism for laminate batteries, an electrolyte resistant layer having high corrosion resistance against the electrolyte may be provided on the surface of the valve element of the safety vent or between the valve element and the molded sheet that makes contact therewith. Thereby, electrolyte-induced deterioration of the valve element which is made of elastic material such as rubber is prevented, any adverse effects on the actuation of the safety vent is prevented, and vent reliability is maintained for a long time.

As the electrolyte resistant layer, a material having a lower water permeability and good chemical resistance is preferably used to ensure that deterioration of the valve element is prevented.

The above safety mechanism for laminate batteries are configured to include a pair of frame plates that compress at least the bonded part around the outer edge of the laminate battery from both sides, a retainer provided in part of the frame plate for retaining the valve element, and an exhaust passage that surrounds the retainer to form a gas introducing space around the valve element, the space communicating with an opening in the end face of the frame plate. With the bonded part of the laminate battery being compressed between the frame plates, the so-called creep phenomenon is prevented, in which the heat-sealed bonded part is gradually peeled away as the exterior case expands with a pressure build-up. Thereby, the safety features of the exterior case are maintained stably for a long time, and moreover, with the frame plates both retaining the valve element and forming part of the exhaust passage, the safety mechanism is made simple and cost is further reduced.

The exhaust passage is formed using an exhaust passage forming component made of an elastic material in the shape that forms the gas introducing space between itself and the periphery of the valve element, the component being held between the frame plate and the opposite molded sheet. Thereby, gas is prevented from leaking out around the exhaust passage.

Moreover, the exhaust passage forming component includes an integrally formed opening-formation portion that surrounds the opening of the exhaust passage, so as to prevent gas from leaking out around the exit opening of the exhaust passage.

The above safety mechanism for laminate batteries is configured to include an exhaust duct connected in communication with the opening of the exhaust passage in the end face of the frame plate for releasing the gas that has flowed through the exhaust passage into a predetermined direction. Thereby, the gas that may contain harmful substances can be guided to a desired place through the exhaust duct and exhausted.

The above safety mechanism for laminate batteries is configured to include a restricting plate integrally or separately provided to the frame plate so as to prevent expansive deformation of the laminate battery; the restricting plate may be abutted on both sides of a single laminate battery, or, on the respective outer face of at least two laminate batteries arranged at both ends of a plurality of laminate batteries arranged in parallel in the thickness direction. Thereby, expansion of the laminate battery due to an internal pressure build-up of the exterior case is restricted, which improves the safety features of the exterior case and which also improves the operation stability of the safety vent because the gas pressure inside the exterior case is made to act precisely on the safety vent.

The safety vent in the above safety mechanism for laminate batteries is configured to include an exhaust hole formed in the protrusion in one of the molded sheets; a valve element making elastic pressure contact with the hole edge of the exhaust hole to seal the hole; and a protection sheet bonded to a portion of the protrusion opposite the exhaust hole on the inner face of the other molded sheet. In this configuration, the safety mechanism can be produced as follows: The protection sheet is bonded beforehand in a preset position on the molded sheet, and two molded sheets are heat-sealed to form the bonded part except for a portion of the outer edge to obtain the exterior case; the electrode plate group is accommodated in the exterior case and an electrolyte is injected; the rest of the outer edge of the exterior case is heat-sealed to form the bonded part, whereby production of the laminate battery is complete; after that, the exhaust hole is formed in one molded sheet by punching the hole at the predetermined position of the protrusion in the laminate battery using a cutting die such as a Thomson blade or a cutter blade. There is no need of closing the exhaust hole with a rubber plug in the process of injecting electrolyte or of using specially designed tools for handling the exterior case, and thereby, production cost can be reduced.

The safety vent in the above safety mechanism for laminate batteries is configured to be resealable, in which the valve element is made up of a spring retained in the frame plates that hold the projection securely from both sides, and a closure plate pressed by the spring to make elastic pressure contact with the hole edge of the exhaust hole to seal the hole. In this configuration, since the spring which is the main component of the safety mechanism does not suffer high-temperature-induced deterioration even if used for a long time in a high temperature atmosphere unlike a rubber valve element which suffers permanent distortion through the years of use, the spring properties do not change largely and therefore the valve operating pressure does not change during a long period of use. The safety mechanism is thus suitably used in relatively special applications, in particular a long-term use in a high temperature environment, such as automobile applications. Also, since a suitable elastic coefficient of the spring can be selected from a wider range than the rubber valve element, by choosing a spring that has a suitable spring constant, a desired valve operating pressure can be achieved precisely without requiring high assembling precision, whereby a reduction in production cost can be achieved.

The safety vent is configured such that a support pin is provided, at one end of which the valve element is securely attached; the spring is interposed between the valve element and the retainer hole in the frame plate so as to surround the support pin; and a gap that allows the support pin to tilt is provided at least one of between the support pin and the spring and between the spring and the hole edge of the retainer hole. In this configuration, when a pressing force is applied from the molded sheet that is bulging out because of the pressure of gas, the support pin tilts to open the safety mechanism. With this structure, a relatively large valve operating pressure can be set with a small compression load to the spring. Since the components holding the safety mechanism do not require high rigidity, the entire structure can be made lighter and smaller accordingly.

To achieve the above object, a laminate battery according to the present invention includes an exterior case formed by superposing two molded sheets upon one another and bonding them together around the outer edges by heat-sealing, the molded sheets being made of laminate sheets having plastic films and a metal foil interposed between the plastic films, and an electrode plate group accommodated in this exterior case. The exterior case is provided, on one side, with a projection that is sealed at a heat-sealed bonded part at the outer edge and that communicates with an internal space of the exterior case. At least one of the two molded sheets that form this protrusion is provided with an exhaust hole. Thus this laminate battery includes the projection that has the exhaust hole, so that the safety mechanism of the present invention is readily provided to achieve the designed effects. Also, with the very simple configuration, the battery can be produced at low cost.

In this laminate battery, a pair of connection terminals respectively connected to both ends of the electrode plate group may be provided such that they protrude from the exterior case through the bonded part on one side of the exterior case. By providing the protrusion that has the exhaust hole on the same side as these connection terminals, the battery configuration can be made compact and inexpensive.

BRIEF DESCRIPTION OF THE DRAWINGS

FIG. 17A and FIG. 17B are longitudinal cross-sectional views illustrating resealable safety vents of conventional batteries with metal battery cases.

BEST MODE FOR CARRYING OUT THE INVENTION

Figure 1:
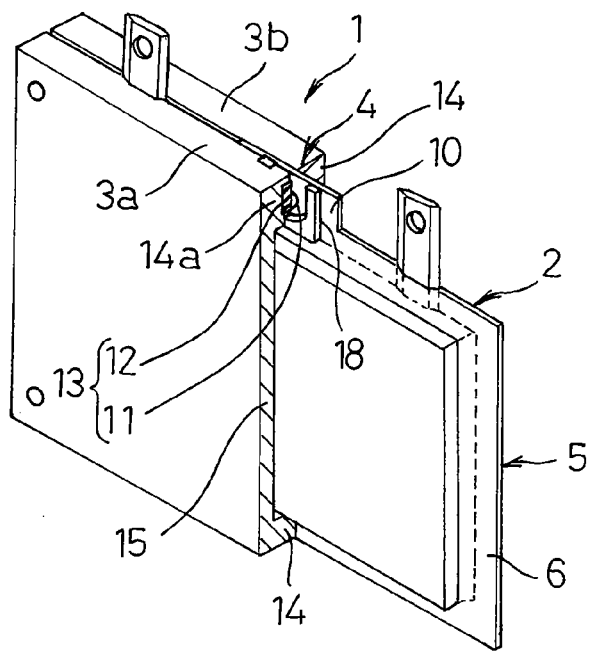
FIG. 1 is a partly broken perspective view of a laminate battery unit to which the safety mechanism for laminate batteries according to a first embodiment of the present invention is adopted.
Figure 2:
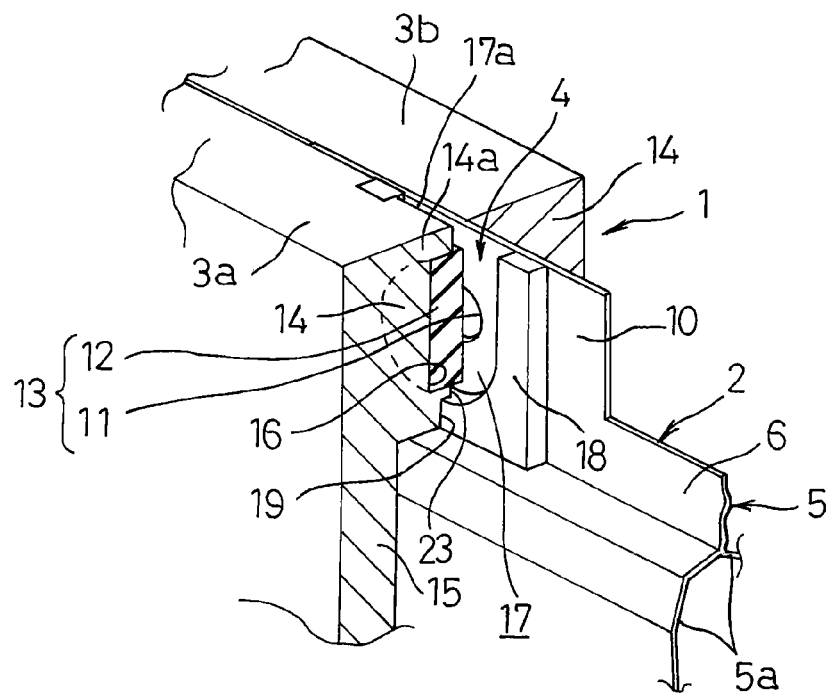
FIG. 2 is an enlarged, partly broken perspective view of major parts of FIG. 1.
Figure 3A:
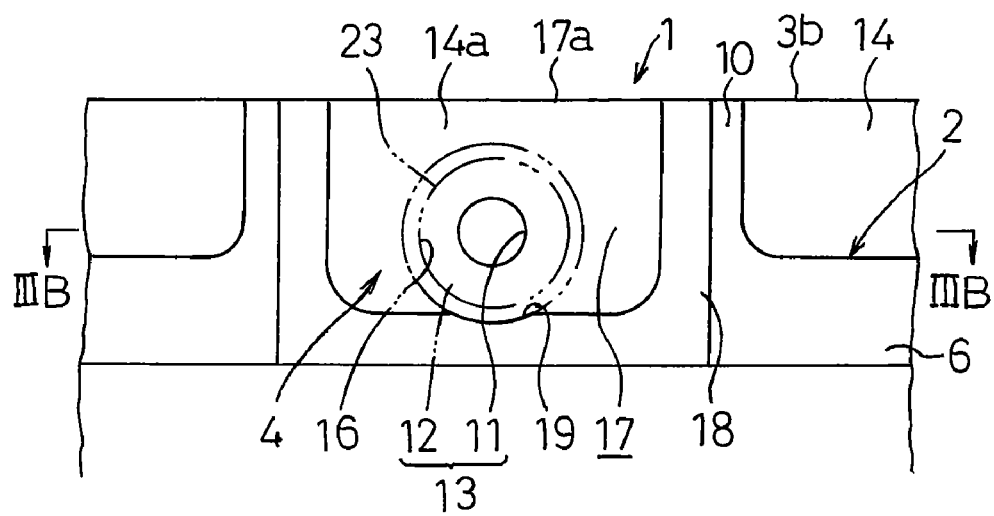
FIG. 3A is a front view, partly removed, of the above laminate battery unit.
Figure 3B:
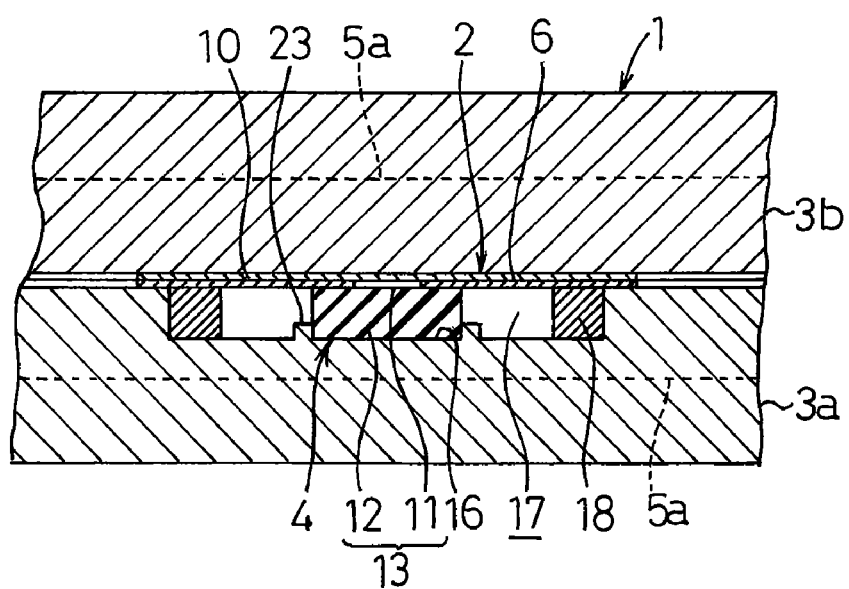
FIG. 3B is a cross section taken along the line IIIB-IIIB of FIG. 3A.

Embodiments of the present invention will be hereinafter described with reference to the drawings. FIG. 1 is a partly broken perspective view of a laminate battery unit 1 to which the safety mechanism for laminate batteries according to a first embodiment of the present invention is adopted. FIG. 2 is an enlarged, partly broken perspective view of major parts of FIG. 1. FIG. 3A is a front view, partly removed, of the laminate battery unit 1, and FIG. 3B is a cross section taken along the line IIIB-IIIB of FIG. 3A. The laminate battery unit 1 is made up of a flat laminate battery 2, which includes a lithium ion battery, a pair of frame plates 3a and 3b that bind the laminate battery 2 and restrict its expansion resulting from a pressure build-up, and a safety mechanism 4 attached to the laminate battery 2 for exhausting the gas generated inside to the outside when the internal pressure of the laminate battery 2 rises to a predetermined level.

Figure 4A:
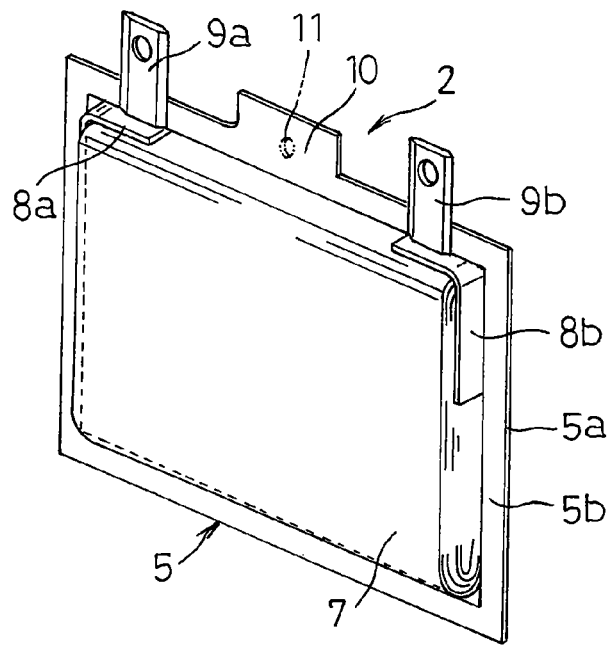
FIG. 4A to FIG. 4C illustrate the above laminate battery, FIG. 4A being a perspective view, partly removed, of the laminate battery, FIG. 4B being a front view, and FIG. 4C being a cross section taken along the line IVC-IVC of FIG. 4B.
Figures 4B, 4C:
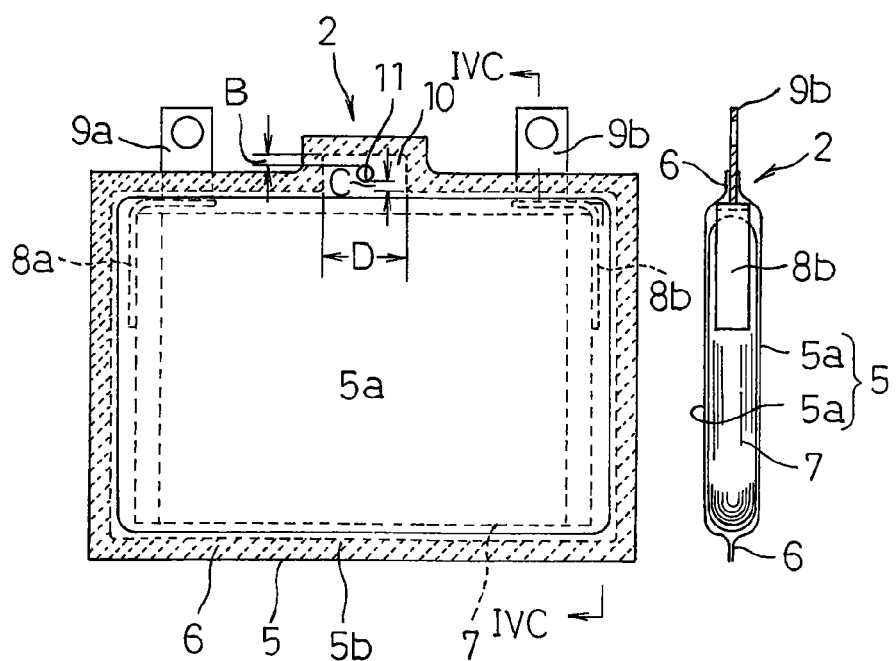

The laminate battery 2 will be described first with reference to FIG. 4A to FIG. 4C. FIG. 4A to FIG. 4C illustrate the laminate battery 2, FIG. 4A being a perspective view, partly removed, of the laminate battery 2, FIG. 4B being a front view, and FIG. 4C being a cross section taken along the line IVC-IVC of FIG. 4B. As clearly shown in FIG. 4C, this laminate battery 2 is made up of an electrode plate group 7 and an electrolyte (not shown) accommodated in an internal space of an exterior case 5, which is made from two molded sheets 5a and 5a superposed upon one another and bonded together around their outer edges by heat sealing. The molded sheets 5a and 5a are made of laminate sheet of plastic films such as PP or PE with a metal foil such as aluminum foil interposed between the plastic layers, and are formed in the shape of a rectangular plate having a dent which is rectangular in top view and a bonding flange 5b around the edge of the dent. This pair of molded sheets 5a and 5a are arranged so that the dents inside the outer edge bonding flanges 5b and 5b face each other to form the internal space, and the plastic films of the bonding flanges 5b and 5b are heat-sealed together, whereby a generally rectangular bonded part 6 is formed, and thus the exterior case 5 having the internal space sealed with this bonded part 6 is obtained. FIG. 4A illustrates the state in which the front side molded sheet 5a of the two sheets has been removed.

The electrode plate group 7 is made up of strips of positive electrode, separator, negative electrode, and separator stacked up in this order and wound around a flat plate core material, which is pulled out after the winding, these being compressed into a flat shape, so that the positive electrode and the negative electrode are layered upon one another with the separators interposed therebetween. The positive electrode is made of an aluminum foil core material and a positive electrode mixture coated thereon and dried. The negative electrode is made of a copper foil core material and is a negative electrode mixture coated thereon and dried. The separators are made of a porous polypropylene film or the like.

The respective core materials of the positive and negative electrodes protrude from the opposite end faces of the electrode plate group 7 respectively, and connection electrodes 8a and 8b are connected to these protruded parts of the core materials by welding. These connection electrodes 8a and 8b are L-shaped plates with a slightly smaller width than the thickness of the electrode plate group 7, with one piece of the L-shape (vertical piece in the drawing) being welded to the core material, the other piece (horizontal piece in the drawing) extending along the upper side of the electrode plate group 7. Connection terminals 9a and 9b for external connection stand up from the tips of the horizontal pieces generally vertically. These connection terminals 9a and 9b extend to the outside through the bonded part 6 of the exterior case 5. The exterior case 5 includes, in the middle between the connection terminals 9a and 9b on one side (upper side in the drawing), an integrally formed rectangular protrusion 10. The outer edge of this protrusion 10 is airtightly bonded by heat sealing so that it is continuous with the outer edge of the exterior case 5 and makes part of the bonded part 6. One of the two molded sheets 5a (front side of the drawing) of this protrusion 10 is formed with a circular exhaust hole 11. The protrusion 10 is formed to provide a resealable safety vent, which will be described later, of the safety mechanism 4. It communicates with the internal space of the exterior case 5 so as to be able to introduce the gas generated inside the battery.

Referring back to FIG. 1, FIG. 3A, and FIG. 3B, the pair of frame plates 3a and 3b include a restricting plate 15 that makes contact with the outer surface of the exterior case 5 and restricts expansive deformation of the laminate battery 2, and a rectangular frame 14 that protrudes inwardly from the outer edge of the restricting plate 15 to compress the outer edge bonded part 6 of the exterior case 5 from both sides, these being integrally formed. Thus, with this safety mechanism 4, the creep phenomenon in which the bonded part 6 is slowly peeled away is prevented, because the restricting plates 15 stop the exterior case 5 from expanding outwards as the internal pressure rises. One side 14a of the frame 14 where it faces the other frame via the protrusion 10 is formed wide so that the protrusion 10 including part of the bonded part 6 is entirely compressed.

FIG. 3A is a front view illustrating the state in which one of the two frame plates 3a (front side of the drawing) and a valve element 12 which is an elastic member and will be described later have been removed. As is clearly shown in FIG. 3A and FIG. 3B, the frame 14 of one frame plate 3a, on its one side 14a opposite the exhaust hole 11, is formed with a retainer hole 16 which is a circular recess having a larger diameter than the exhaust hole 11. That is, the retainer hole 16 is defined by the recess inside a circular partition wall 23. In this retainer hole 16 is fitted and held about one third of the valve element 12 made of elastic material such as EPDM having rubber elasticity. This valve element 12 is attached in a compressed state with a preset compression ratio as will be described later so that it makes elastic pressure contact with the edge of the exhaust hole 11 by its compression reaction force to seal the exhaust hole 11. This exhaust hole 11 and the valve element 12 constitute the resealable safety vent 13.

On one side 14a of the frame 14 of one frame plate 3a is further formed a gas exhaust passage 17, which is defined between both frames 14 and 14 by a recess that surrounds the circular partition wall 23, inside of which the retainer hole 16 is formed. This exhaust passage 17 has an opening 17a at the end face of one side 14a of the frame 14. The frame 14 of the other frame plate 3b is provided with a generally U-shaped, elastic exhaust passage forming component 18, with its part (lower end in the drawing) being fitted in a retainer groove 19 formed on the outer side of the circular partition wall 23. The exhaust passage forming component 18 defines the outer wall of the exhaust passage 17 and is compressed between the outer surface of the protrusion 10 and one side 14a of the frame 14 by the pair of frames 14 and 14. Therefore the exhaust passage 17 is sealed except its opening 17a so that, when the safety mechanism 4 is actuated to be opened as will be described later, gas from the exhaust hole 11 is introduced through the exhaust passage forming component 18 to the opening 17a.

The valve operating pressure of the resealable safety vent 13 in the safety mechanism 4 can be suitably determined by the elastic coefficient and compression ratio of the valve element 12 made of an elastic material such as EPDM as mentioned above. The valve operating pressure is preferably set from 0.4 to 0.7 MPa, and more preferably about 0.5 MPa, with the tolerance range of variation in valve operation pressure being ±0.05 MPa. The compression ratio of the valve element 12 is set 30% or less, and preferably 25% or less. Thereby, permanent distortion of the valve element 12 made of an elastic material such as rubber is restricted as much as possible to prevent variation in the valve operating pressure resulting from permanent distortion, which ensures stable actuation of the resealable safety vent 13 for a long period of time.

The exhaust hole 11 needs to have a diameter that can ensure release of a sufficient amount of gas to stop the pressure rise inside the exterior case 5. From a practical point of view, the amount of gas that needs to be released is about one to several hundreds cc/sec at the above valve operating pressure, and therefore about 3 to 6 mm is enough for the diameter of the exhaust hole 11. On the other hand, the valve element 12 that seals the exhaust hole 11 preferably has a diameter that is twice or three times larger than that of the exhaust hole 11. The material of the valve element 12 may be EPD specifically configured for vent applications, or EPDM/urethane double layer rubber, with the rubber hardness preferably being about 70 to 85 Hs. It is more preferable to add PP plastic to EPDM so that the elastic coefficient will decrease at a high temperature of about 80° C. to lower the valve operating pressure. That is, in the event of heat generation in the laminate battery, the vent is actuated, despite low pressure, by the high temperature to release gas to the outside of the exterior case 5.

Figure 5A:
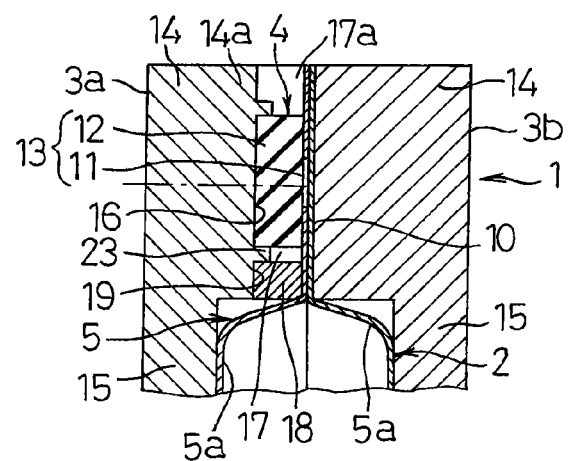
FIG. 5A and FIG. 5B are longitudinal cross-sectional views respectively illustrating the states before and after actuation of the vent in the above safety mechanism.

A description will now be given of the action of the resealable safety vent 13 of the safety mechanism 4 with reference to FIG. 5A to FIG. 5C. When the pressure in the exterior case 5 of the laminate battery 2 is equal to or below the predetermined valve operating pressure (in this embodiment 0.4 to 0.7 MPa as mentioned above), the valve element 12 which is fitted and retained in the retainer hole 16 of the frame 14 with a predetermined compression ratio is making elastic pressure contact with the hole edge of the exhaust hole 11 in the protrusion 10 of one of the molded sheets 5a, thereby sealing the exhaust hole 11, as shown in FIG. 5A.

Figure 5B:
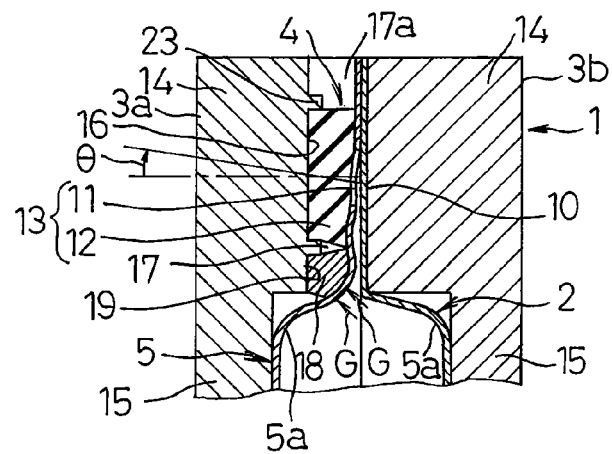
Figure 5C:
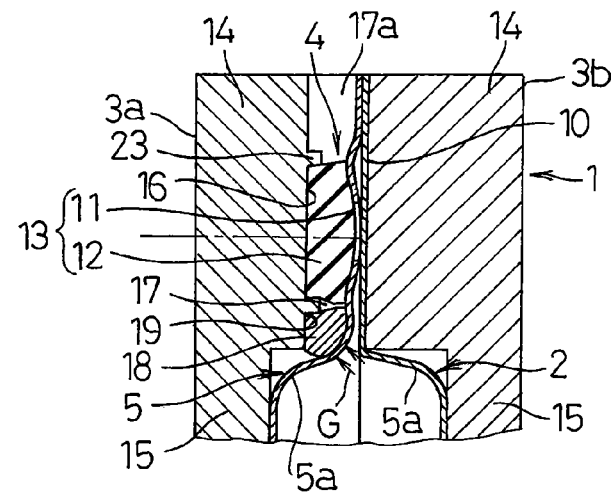
FIG. 5C is a longitudinal cross-sectional view illustrating, for comparison, the state after actuation of the vent, with the exhaust hole being provided in a different position from the above safety mechanism.

When the pressure in the exterior case 5 of the laminate battery 2 reaches the predetermined valve operating pressure, pressure of generated gas G that has flowed into the protrusion 10 causes the molded sheet 5a to expand outwardly, as well as causes compressive deformation of the elastic exhaust passage forming component 18, as shown in FIG. 5B. The pressure of generated gas G acting on the valve element 12 through the expanding molded sheet 5a causes elastic deformation of the valve element 12, making it incline at a certain angle $\theta$. The resealable safety vent 13 is thereby opened. Note, the pressure of generated gas G acts not only on the portion of the valve element 12 directly opposite the exhaust hole 11, but also on its entire end surface from the outer periphery through the molded sheet 5a around the hole edge of the exhaust hole 11.

Therefore, the resealable safety vent 13 provides reliable sealing properties against pressure variation of 0.3 MPa or lower during normal use, and is capable of operating without failure even at a low pressure of about 0.4 to 0.7 MPa as mentioned above. Moreover, variation in the valve operating pressure is small, i.e., high precision is achieved in the valve operating pressure, with the tolerance range of variation in valve operating pressure being within ±0.05 MPa. Accordingly, even though the exterior case 5 has pressure resistance of about 1.0 MPa, high safety is secured, because the resealable safety vent 13 does not operate within the normal range of pressure variation of 0.3 MPa or lower in the laminate battery 2, and because the internal pressure is reliably prevented from rising up to near the pressure resistance and the vent actuates without failure at the time point when the internal pressure of the exterior case 5 has reached the predetermined level, the safety features are reliably maintained.

When the resealable safety vent 13 is open, as shown in FIG. 5B, the exhaust passage forming component 18 is compressed and deformed while maintaining tight engagement with the retainer groove 19 of the frame 14. The exhaust passage forming component 18 therefore keeps the exhaust passage 17 around the exhaust hole 11 tightly closed except for the opening 17a. The gas G generated in the exterior case 5 is let out from the exhaust hole 11, guided smoothly towards the opening 17a by the almost entirely sealed exhaust passage 17, and exhausted to the outside from the opening 17a. Since the generated gas G is exhausted exclusively from the opening 17a, an abnormality is reliably discovered by detecting the release of generated gas G, which enables correct determination as to which battery is not usable as the power source.

If the pressure build-up is a temporary one, the laminate battery 2 can be used further because a necessary amount of generated gas G has been released to lower the internal pressure equal to or below the valve operating level and at that time the compressed valve element 12 recovers its shape by its restoring force and seals the exhaust hole 11 again. Accordingly, in an application where a plurality of laminate batteries 2 are electrically connected in series and used as a battery power source, a temporary rise in the internal pressure of some laminate batteries 2 does not disable the entire battery power source.

With the above-described resealable safety vent 13, since the bonded part 6 around the edge of the exterior case 5 of the laminate battery 2 is tightly held from both sides by the frames 14 of the frame plates 3a and 3b, the creep phenomenon is prevented, in which the bonded part 6 is slowly peeled away because of expansion of the exterior case 5 due to an internal pressure build-up, whereby the safety features of the exterior case 5 are reliably maintained. The restricting plates 15 of the frame plates 3a and 3b that make contact with both sides of the laminate battery 2 and restrict its expansive deformation further improves the safety features of the exterior case 5 and ensure that internal pressure of the exterior case 5 acts precisely on the valve element 12, thereby improving the operation stability of the resealable safety vent 13. Moreover, the frames 14 not only retain the valve element 12 but also provide the function of forming the exhaust passage 17, which makes the resealable safety vent 13 simple and low cost.

Figure 6:
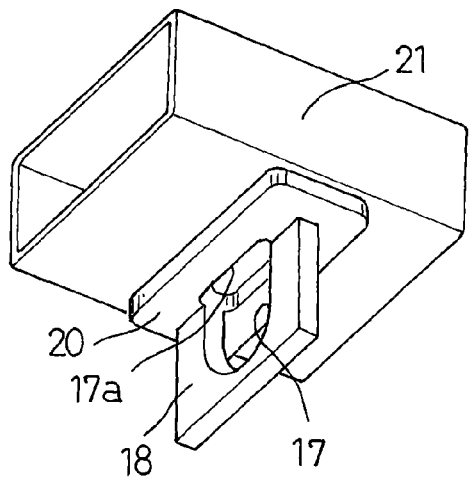
FIG. 6 is an enlarged perspective view illustrating the constituent elements of the exhaust system in the above embodiment.

Note that the exhaust system of gas G in the above safety mechanism 4 is further provided with a preferable structure as shown in FIG. 6. The exhaust passage forming component 18 is integrally connected with an opening-formation portion 20 that surrounds the opening 17a of the exhaust passage 17 and communicates with the passage 17. To the opening-formation portion 20, an exhaust duct 21 is connected which communicates with the opening 17a of the exhaust passage 17 through the aperture. Since the above structure is further provided such that the exhaust passage 17 is formed by the exhaust passage forming component 18 which is an elastic member held between the frames 14, gas G introduced into the exhaust passage 17 is prevented from leaking out around the exhaust passage 17. In addition to this, with this structure, as the gas G in the exhaust passage 17 is smoothly introduced into the opening-formation portion 20, it is also prevented reliably from leaking out around the exit of the exhaust passage 17. The gas G introduced into the opening-formation portion 20 is then guided to a desired part by the exhaust duct 21 and exhausted, which, if the laminate battery unit 1 is placed outdoors or mounted on an automobile, prevents any human damage even if the exhaust gas G may contain harmful substances.

To ensure that various remarkable effects of the safety mechanism 4 of the above embodiment are achieved, the following remaining problem needs to be solved: The position of the exhaust hole 11 in the protrusion 10 relative to the protruding side of the bonded part 6 is crucial in order to make the valve element 12 operate precisely at the predetermined valve operating pressure. If the exhaust hole 11 is provided in an inappropriate position, the valve element 12 may not operate at the predetermined valve operating pressure, or, even if it does, the exhaust gas G may not be released sufficiently.

The safety mechanism 4 of the above embodiment has the following characteristics in the position of the exhaust hole 11: As shown in FIG. 4B, the distance B between the upper edge of the exhaust hole 11 and the inner edge of the bonded part 6 of the protrusion 10 on the protruded side is 1.5 mm or less, and preferably 1.0 mm or less. This feature enables the resealable safety vent 13 to operate precisely at the predetermined valve operating pressure, but it will be described later in more detail. The distance C between the lower edge of the exhaust hole 11 and the outer edge of the bonded part 6 on both sides of the protrusion 10 of the exterior case 5 does not give much influence on the actuation of the resealable safety vent 13. The distance D between the bonded parts 6 that face each other along one side of the protrusion 10 has such an influence that the larger the distance D is, the higher the valve operating pressure becomes, increasing the amount of exhaust gas.

With the distance B between the upper edge of the exhaust hole 11 and the inner edge of the bonded part 6 of the protrusion 10 on the protruded side being 1 mm or less as described above, the resealable safety vent 13 in the safety mechanism 4 is capable of operating precisely at the predetermined valve operating pressure, which was ascertained through experiments. In the experiment, the exhaust hole 11 had a diameter of 4 mm, while the valve element 12 had a diameter of 9 mm, and with the distance D being constant, the distance B was varied in the range of from −0.5 to 5 mm and the distance C was varied in the range of from 4 to 7.5 mm. With respect to each case, it was checked whether the resealable safety vent 13 operated or not at the predetermined valve operating pressure. The results showed that actuation of the resealable safety vent 13 did not much depend on the difference in the distance C but largely depended on the difference in the distance B. That is, when the distance B was 1 mm or less, the resealable safety vent 13 operated well irrespective of the difference in the distance C. When the distance B was 1.5 mm, the resealable safety vent 13 did operate in test pieces with the distance C of 5 mm or more, but the amount of exhaust gas was slightly lower than the predetermined level. On the other hand, it was found that, when the distance B was 2 mm or more, the resealable safety vent 13 did not operate.

Figure 7A:
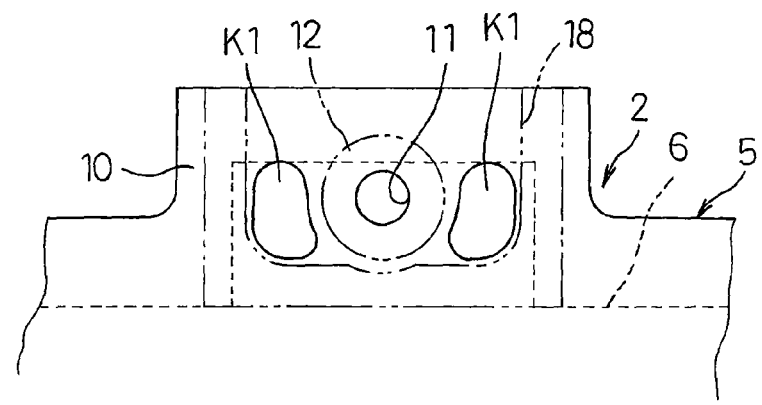
FIG. 7A is a front view illustrating the state after actuation of the vent in the laminate battery provided with the above safety mechanism.
Figure 7B:
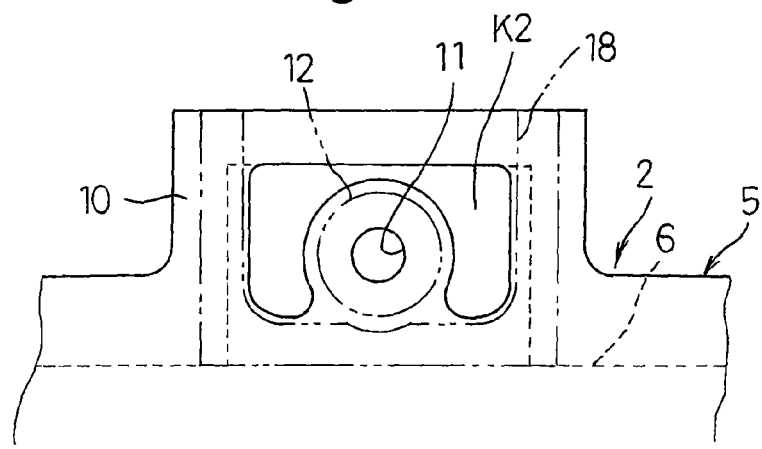
FIG. 7B is a front view illustrating, for comparison, the state after actuation of the vent in a laminate battery that has its exhaust hole provided in a different position from the above laminate battery.

FIG. 7A and FIG. 7B illustrate the protrusion 10 of the laminate battery 2 after the experiments described above. FIG. 7A shows a test piece with the distance B of 1 mm or less, and FIG. 7B shows a test piece with the distance B of 2 mm or more. In the laminate battery 2 shown in FIG. 7A, the expansive deformation K1 induced by gas pressure in the molded sheet 5a that has the exhaust hole 11 is observed on both sides of the exhaust hole 11 in a direction orthogonal to the protruding direction. This is because, the distance B being small, the gas G did not penetrate into this portion having the small distance B. Thereby, the molded sheet 5a having the exhaust hole 11 was deformed such as to bulge out in the portion below the exhaust hole 11 as shown in FIG. 5B because of the gas pressure concentrating locally on it. This deforming force of the molded sheet 5a made the valve element 12 tilt outwards with its upper end acting as fulcrum. The gas exhaust route that is provided by releasing the seal of the exhaust hole 11 is thus secured reliably.

On the other hand, in the laminate battery 2 shown in FIG. 7B, the expansive deformation K2 induced by pressure of the generated gas G in the molded sheet 5a that has the exhaust hole 11 is observed on both sides of the exhaust hole 11 both in the protruding direction of the protrusion 10 and in a direction orthogonal to the protruding direction. This shows that, the distance B being relatively wide, generated gas G penetrated into the portion having the distance B. Therefore, as shown in FIG. 5C for comparison, the molded sheet 5a having the exhaust hole 11 on the left side of the drawing is deformed such as to bulge out in portions both below and above the exhaust hole 11 due to the pressure of the generated gas G. The valve element 12 is not tilted but slightly displaced outwardly by the deforming force of the molded sheet 5a, because of which the gas exhaust route that is provided by releasing the seal of the exhaust hole 11 is not smoothly formed.

According to the safety mechanism 4 of the first embodiment, one of the two superposed molded sheets 5a has the exhaust hole 11. In the production process, it is difficult to form the exhaust hole 11 only in one of the molded sheets 5a after the outer edges of the two molded sheets 5a have been bonded together by heat sealing, and therefore it is necessary to form the exhaust hole 11 in one of the molded sheets 5a prior to the bonding process of the two molded sheets 5a. In that case, after heat-sealing the outer edges of the two superposed molded sheets 5a to form a bag-shaped exterior case 5 and inserting the electrode plate group 7 in the case, in the process of injecting an electrolyte, it is further necessary to close the exhaust hole 11 with a rubber plug or the like in order to prevent failures such as electrolyte leakage or entrance of water into the electrolyte through the exhaust hole 11. Furthermore, in the battery production process later, it is necessary to use specially designed tools for handling the exterior case 5. These may result in elevation of production cost.

Such problem could well be resolved by devising a suitable production method. Second and third embodiments of the present invention described next offer some configurations that allow production of the safety vents without significant cost elevation by using existing production means, and that can provide the remarkable effects described above.

Figure 8:
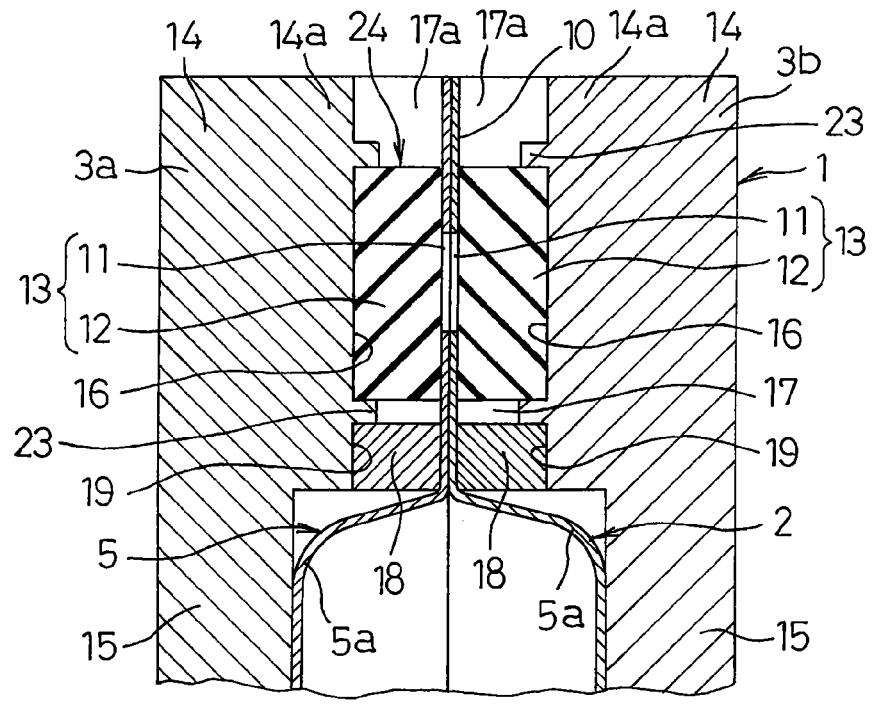
FIG. 8 is a cross-sectional view of major parts of a laminate battery unit to which the safety mechanism for laminate batteries according to a second embodiment of the present invention is adopted.

FIG. 8 is a cross-sectional view of major parts of a laminate battery unit 1 that has the safety mechanism 24 according to the second embodiment of the present invention. Elements that are the same as or substantially equivalent to those of FIG. 1 through FIG. 3A, and FIG. 3B are given the same reference numerals in the drawing to avoid repetition of description. The safety mechanism 24 is provided with a pair of the resealable safety vents 13 having the same structure as the first embodiment: Exhaust holes 11 are formed in both of the pair of molded sheets 5a in the protrusion 10 at the same time; retainer holes 16 are respectively formed on one side 14a of each frame 14 of the frame plates 3a and 3b, in which the valve elements 12 are retained; these valve elements 12 make elastic pressure contact with the edges of their respective opposite exhaust holes 11 to seal them. Not to mention, the pair of exhaust holes 11 are provided in the protrusion 10 at the same position as described with respect to the exhaust hole 11 of the first embodiment.

The laminate battery unit 1 having this safety mechanism 24 can be produced in the following manner: The electrode plate group (not shown) is accommodated in the exterior case 5 and an electrolyte is injected; the entire outer edge of the exterior case 5 is heat-sealed to form the bonded part 6, whereby production of the laminate battery 2 is complete; successively, the pair of exhaust holes 11 are formed at the same time by punching the holes in the pair of molded sheets 5a at the predetermined position of the protrusion 10 in the laminate battery 2 using a punch and die set. Thereby, there is no need of closing the exhaust hole 11 with a rubber plug or the like in the process of injecting electrolyte or of using specially designed tools for handling the exterior case 5 as with the safety mechanism 4 with the exhaust hole 11 provided only in one molded sheet 5a according to the first embodiment, and so there is no production cost elevation.

The safety mechanism 24 produced through the processes described above has somewhat different valve operating characteristics from the safety mechanism 4 of the first embodiment. Using the clear correlation between the compression ratio of the valve element 12 and the valve operating pressure, the compression ratio of the valve elements 12 is set slightly lower than that of the first embodiment, whereby the same valve operating pressure as that described in the first embodiment can be set, at which the safety vent can be made to operate precisely. In addition to this, the safety mechanism 24 has an advantage that the release amount of gas can be made large without increasing the diameter of the exhaust hole 11 or the valve element 12.

Figure 9:
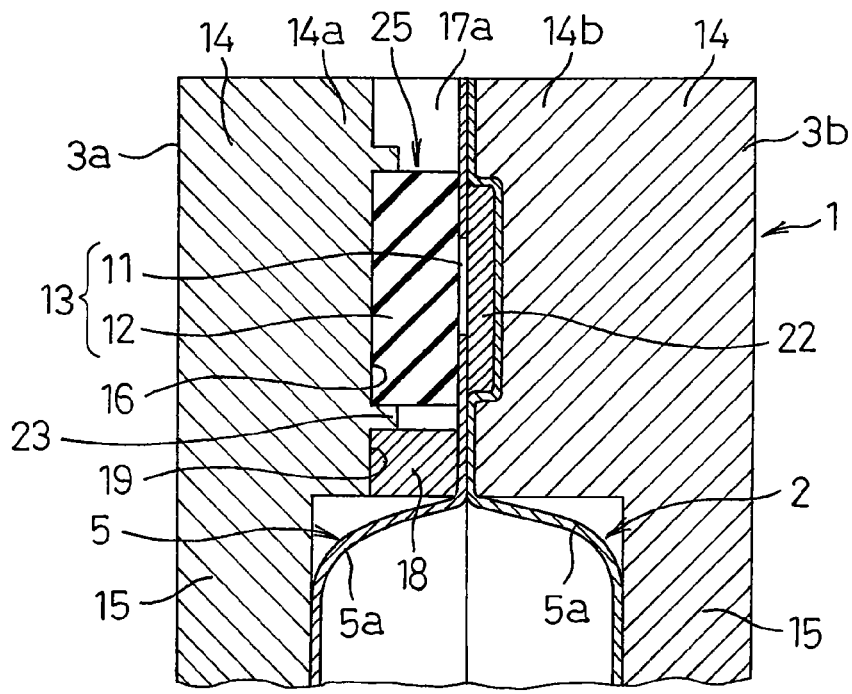
FIG. 9 is a cross-sectional view of major parts of a laminate battery unit to which the safety mechanism for laminate batteries according to a third embodiment of the present invention is adopted.

FIG. 9 is a cross-sectional view of major parts of a laminate battery unit 1 having the safety mechanism 25 according to a third embodiment of the present invention. Elements that are the same as or substantially equivalent to those of FIG. 1 through FIG. 3A, and FIG. 3B are given the same reference numerals in the drawing to avoid repetition of description. The safety mechanism 25 has substantially the same basic structure as the safety mechanism 4 of the first embodiment. In addition to this, a protection sheet 22 having a larger area than the exhaust hole 11 and a thickness of 1 mm is bonded by heat sealing to a portion opposite the exhaust hole 11 of the molded sheet 5*a* that is superposed on the molded sheet 5*a* having the exhaust hole 11 (right side in the drawing).

The laminate battery unit 1 having this safety mechanism 25 can be produced in the following manner: The protection sheet 22 is bonded beforehand to a preset location on the molded sheet 5*a*, and two molded sheets 5*a* are heat-sealed to form the bonded part 6 except for a portion of the outer edge to obtain the exterior case 5; the electrode plate group (not shown) is accommodated in the exterior case 5 and an electrolyte is injected; the rest of the outer edge of the exterior case 5 is heat-sealed to form the bonded part 6, whereby production of the laminate battery 2 is complete. After that, the exhaust hole 11 is formed by punching the hole only in one molded sheet 5*a* at the predetermined position of the protrusion 10 in the laminate battery 2 using a cutting die such as a Thomson blade or a cutter blade. The punching of the exhaust hole 11 is performed such that the tip of the Thomson blade or cutter blade cuts into the protection sheet 22 to a depth equal to or smaller than the thickness of the sheet. Thus the safety mechanism 25, which has the exhaust hole 11 in only one molded sheet 5*a* as with the first embodiment, can be produced through the process of forming the exhaust hole 11 that is performed to a complete laminate battery 2. Thereby, as with the second embodiment, there is no need of closing the exhaust hole 11 with a rubber plug in the process of injecting electrolyte or of using specially designed tools for handling the exterior case 5, and there would be no production cost elevation.

It was ascertained that the safety mechanism 25 produced through the processes described above can operate precisely at the predetermined valve operating pressure similarly to the first embodiment, with the valve operating pressure being set similarly to the safety mechanism 4 of the first embodiment.

Figure 10:
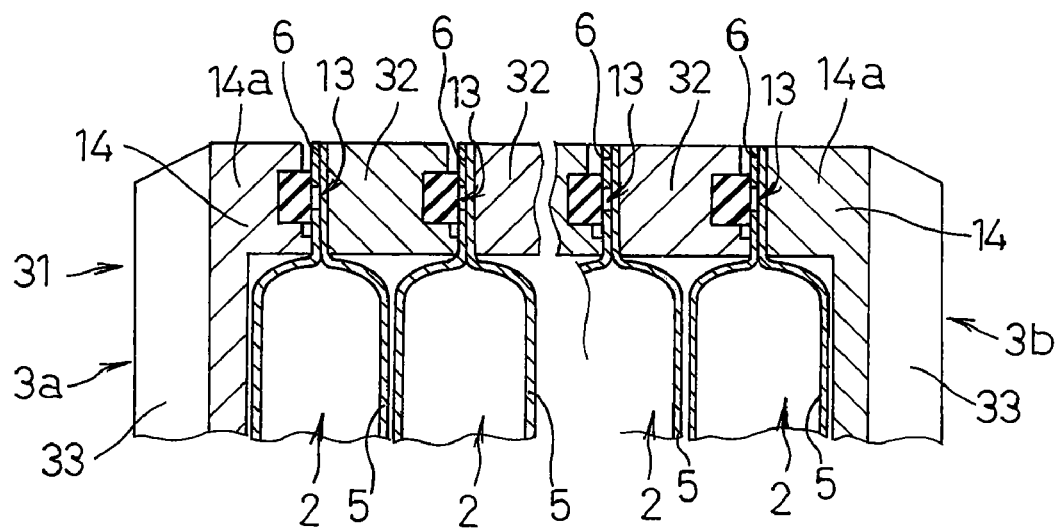
FIG. 10 is a cross-sectional view of major parts of a laminate battery unit to which the safety mechanism for laminate batteries according to a fourth embodiment of the present invention is adopted.

FIG. 10 is a cross-sectional view of major parts of a laminate battery unit 31 to which the safety mechanism according to a fourth embodiment of the present invention is adopted. Elements that are the same as or substantially equivalent to those of FIG. 1 through FIG. 3A, and FIG. 3B are given the same reference numerals in the drawing to avoid repetition of description. The laminate battery units 1 according to the first to third embodiments have a common configuration having a single laminate battery 2 in which a pair of frame plates 3*a* and 3*b* compress the bonding part 6 along the outer edge of the exterior case 5 from both sides. The laminate battery unit 31 of the present embodiment includes a plurality of laminate batteries 2 arranged in parallel such that they abut on each other in the thickness direction, with the frame plates 3*a* and 3*b* compressing them from both ends in the direction of arrangement of the batteries 2. Therefore, between the bonded parts 6 of each intermediate laminate battery 2 except for the end batteries, a frame 32 is interposed in which the resealable safety vent 13 can be mounted similarly to the one described in the first embodiment. The pair of frame plates 3*a* and 3*b* disposed at both ends require a relatively high rigidity, so each of them is provided with reinforcing ribs 33 on the outer surface.

The present embodiment provides a laminate battery unit 31 with a higher output voltage. Although not shown, this laminate battery unit 31 is preferably provided with cooling fluid passage forming parts interposed between the laminate batteries 2 to form cooling fluid passages. Such cooling fluid passage forming parts may be integrally formed on each frame 32 so as to reduce the number of assembling steps.

Figure 11:
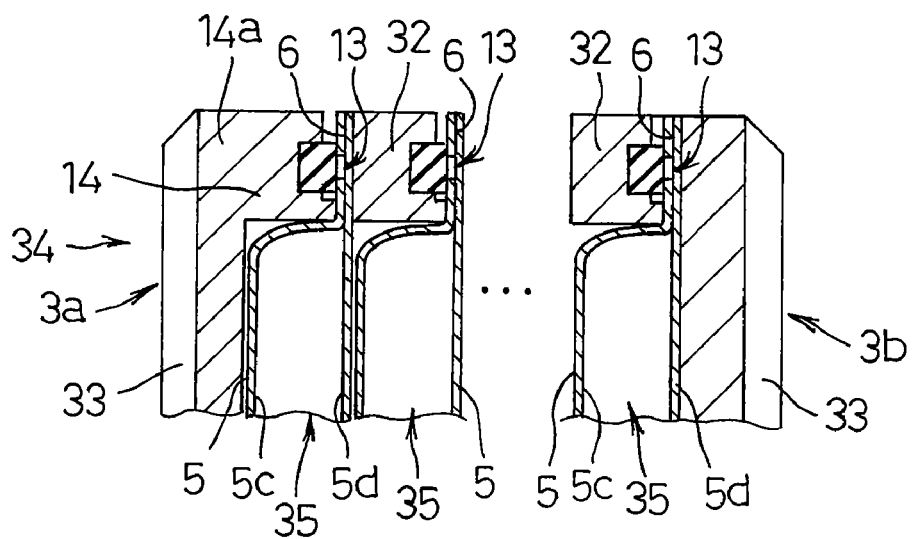
FIG. 11 is a cross-sectional view of major parts of a laminate battery unit to which the safety mechanism for laminate batteries according to a fifth embodiment of the present invention is adopted.

FIG. 11 is a cross-sectional view of major parts of a laminate battery unit 34 to which the safety mechanism according to a fifth embodiment of the present invention is adopted. Elements that are the same as or substantially equivalent to those of FIG. 1 through FIG. 3A, FIG. 3B, and FIG. 10 are given the same reference numerals in the drawing to avoid repetition of description. The laminate battery units 1 and 31 according to the first to fourth embodiments have a common configuration for the bag-shaped laminate battery 2 that is formed by a pair of molded sheets 5*a* in the form of a rectangular plate having a bonding flange 5*b* around the recess, the bonding flanges 5*b* of opposite molded sheets 5*a* being heat-sealed to form the bonded part 6. The exterior case 5 of the laminate battery 35 in this laminate battery unit 34, according to the present embodiment, uses a molded sheet 5*c* in the shape of a rectangular plate that is deeper than the molded sheet 5*a*, this molded sheet 5*c* being superposed upon a flat molded sheet 5*d* and their outer edges being heat-sealed to form the bonded part 6.

The laminate battery unit 34 includes a plurality of the laminate batteries 35 arranged in parallel such that they abut on each other in the thickness direction as with the fourth embodiment, with the frame plates 3*a* and 3*b* compressing them from both ends in the direction of arrangement of the laminate batteries 35. The effects achieved with this laminate battery unit 34 are the same as those with the laminate battery units 1, 31, and 34 of the first to fourth embodiments. A laminate battery unit having a single laminate battery 35 compressed from both sides by the frame plates 3*a* and 3*b* similarly to the first to fourth embodiments may also be formed using this laminate battery 35.

Figure 12:
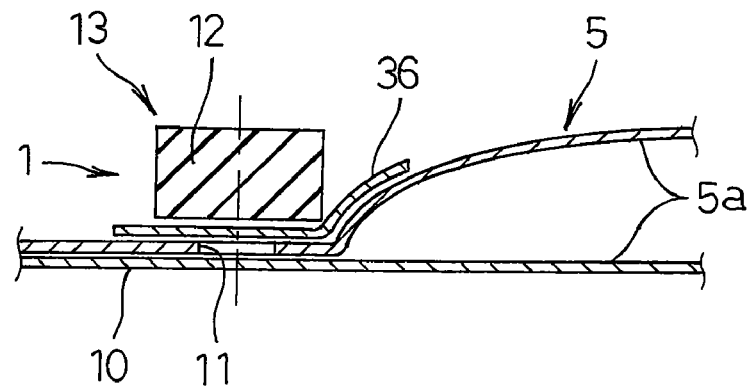
FIG. 12 is a cross-sectional view of major parts of a laminate battery unit to which the safety mechanism for laminate batteries according to a sixth embodiment of the present invention is adopted.

FIG. 12 is a cross-sectional view of major parts of a laminate battery unit 1 to which the safety mechanism according to a sixth embodiment of the present invention is adopted. Elements that are the same as or substantially equivalent to those of FIG. 1 through FIG. 3A, and FIG. 3B, are given the same reference numerals in the drawing to avoid repetition of description. According to the first to fifth embodiments, the resealable safety vent has the configuration in which the valve element 12 makes direct pressure contact with the hole edge of the exhaust hole 11 in the molded sheet 5*a* or 5*c*. The resealable safety vent 13 in the laminate battery unit 1 of the present embodiment has a configuration in which an electrolyte resistant sheet 36 of a material having high resistance against the electrolyte, such as polypropylene, polyethylene, or polytetrafluoroethylene, with a thickness of about 0.1 mm, is interposed between the end face of the valve element 12 and the hole edge of the exhaust hole 11 in the molded sheet 5*a*.

With this laminate battery unit 1, since the electrolyte does not directly contact the valve element 12 because of the electrolyte resistant sheet 36 interposed between the end face of the valve element 12 and the hole edge of the exhaust hole 11 in the molded sheet 5*a* an electrolyte-induced deterioration of the valve element 12 is prevented. With this resealable safety vent 13, the presence of the electrolyte resistant sheet 36 makes the valve operating pressure slightly higher than those of the first to fifth embodiments, but it was ascertained that the sheet did not adversely affect actuation of the valve element 12. While the electrolyte resistant sheet 36 interposed between the end face of the valve element 12 and the hole edge of the exhaust hole 11 in the molded sheet 5*a* is a separate piece in the example shown in FIG. 12, the present embodiment is not limited to this example. It goes without saying that, for example, the electrolyte resistant sheet 36 may be integrally formed on the end face of the valve element 12 by molding with application of heat and pressure; or a coating layer of a material that has high resistance against the electrolyte such as silicon resin or polytetrafluoroethylene emulsion may be integrally formed on the end face of the valve element 12.

The safety mechanisms 4, 24, and 25 of the first to sixth embodiments described above all provide the various remarkable effects unless they are used in special applications. Preferably, they are not used for relatively special applications, in particular a long-term use in a high temperature atmosphere, because of the vent configuration of the resealable safety vent 13 in which the valve element 12 made of an elastic material such as rubber is elastically deformed by the pressure of gas G.

More specifically, the valve element 12 which is the main component of the resealable safety vent 13 and made of an elastic material such as rubber may suffer permanent distortion due to aging deterioration or degeneration resulting from the atmosphere of the site in which the battery is used. Such permanent distortion decreases the initially set valve operating pressure. According to the results of experiments, the valve operating pressure can be set to about 0.9 MPa with a rubber valve element 12 compressed with a compression ratio of about 13%, but when used in an atmosphere with a temperature of 60° C., after 15 years, the compression ratio of the rubber valve element 12 reduced from the initial 13% to 8% due to permanent distortion of about 40%. With this, the valve operating pressure decreases from the initial setting of about 0.9 MPa to about 0.5 MPa. Since permanent distortion accelerates when the temperature is higher, if the battery were used in an atmosphere with a temperature of more than 60° C., the permanent distortion would be larger. Therefore, using the resealable safety vent 13 having a rubber valve element 12 for relatively special applications, i.e., in a high temperature atmosphere for a long period of time, would pose difficulties because the valve operating pressure will decrease as it is used for years as described above.

Accordingly, for relatively special applications in which the battery is used in a high temperature atmosphere for a long period of time, for example for automobile applications, it is desirable to provide another safety mechanism that has a configuration suitable for such application and can be used instead of the safety mechanisms 4, 24, and 25 of the first to sixth embodiments. The seventh embodiment of the present invention thus provides a safety mechanism that can stably maintain the initially set valve operating pressure for a long period of time even in a long-term use in a high temperature environment.

Figure 13:
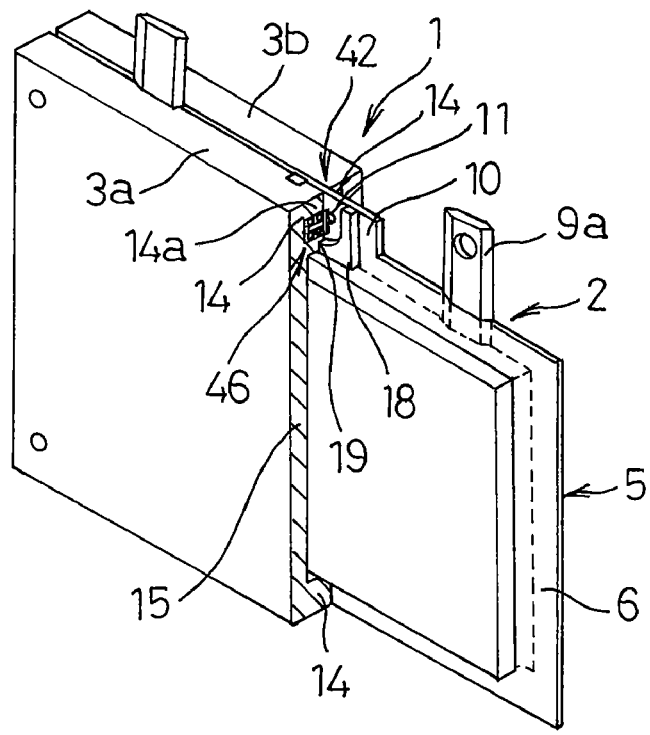
FIG. 13 is a partly broken perspective view of a laminate battery unit to which the safety mechanism for laminate batteries according to a seventh embodiment of the present invention is adopted.
Figure 14:
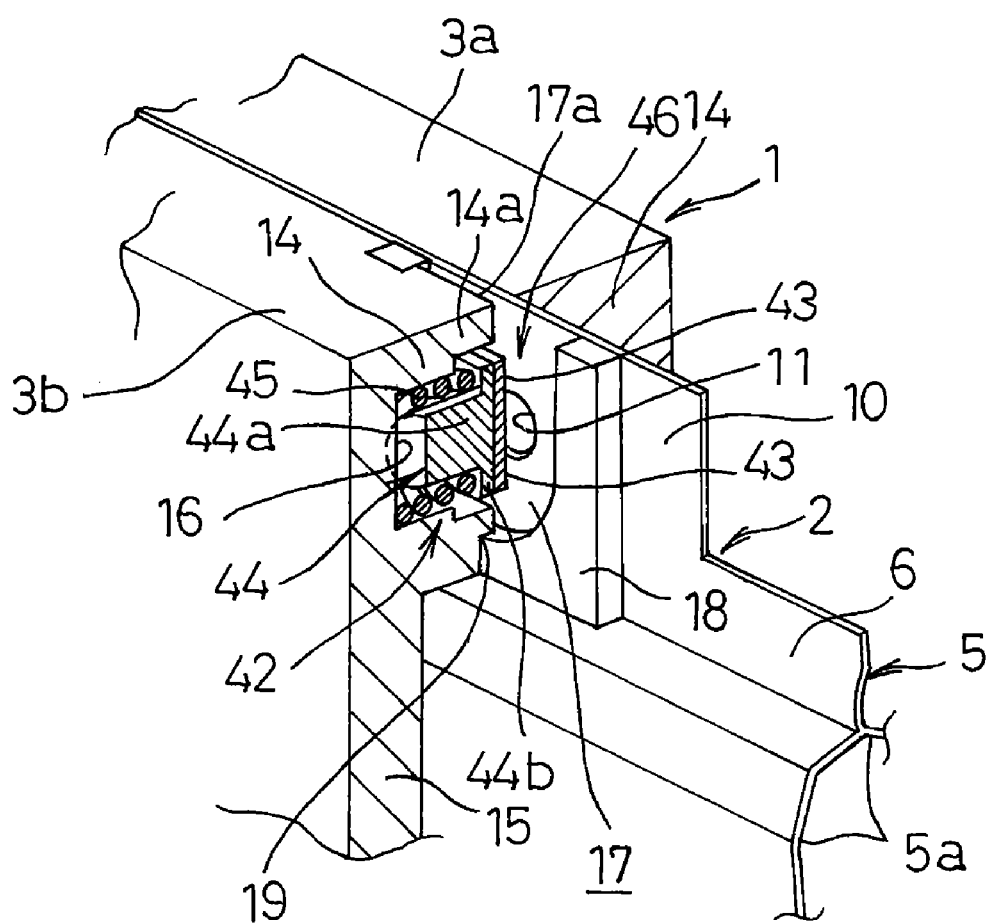
FIG. 14 is an enlarged perspective view of major parts of FIG. 13.
Figure 15A:
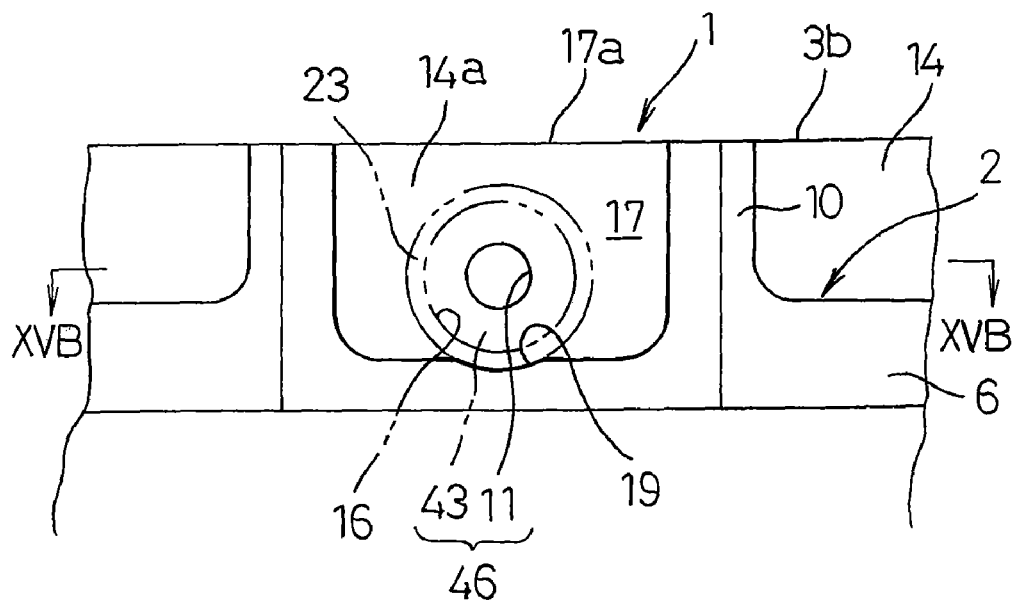
FIG. 15A is a front view, partly removed, of major parts of the above laminate battery unit.
Figure 15B:
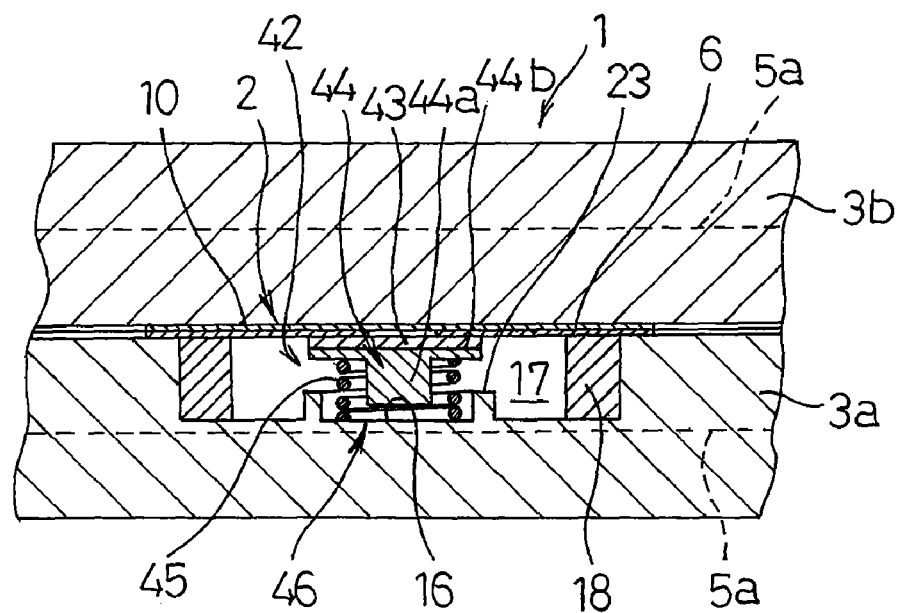
FIG. 15B is a cross section taken along the line XVB-XVB of FIG. 15A.

FIG. 13 through FIG. 15A, and FIG. 15B illustrate the laminate battery unit 1 to which the safety mechanism for laminate batteries according to a seventh embodiment of the present invention is adopted. FIG. 13 is a partly broken perspective view, FIG. 14 is an enlarged perspective view of major parts of FIG. 13, FIG. 15A is a front view, partly removed, of major parts, and FIG. 15B is a cross section taken along the line XVB-XVB of FIG. 15A. In these drawings, elements that are the same as or substantially equivalent to those of FIG. 1 through FIG. 3A, and FIG. 3B, are given the same reference numerals to avoid repetition of description.

FIG. 13 through FIG. 15A and FIG. 15B correspond respectively to FIG. 1 through FIG. 3A, and FIG. 3B.

The laminate battery unit 1, similarly to the first embodiment, is made up of a flat laminate battery 2, which consists of a lithium ion battery, a pair of frame plates 3*a* and 3*b* that form a holder for restricting the laminate battery 2 so as to restrict its expansion resulting from a pressure build-up, and a safety mechanism 42 that opens a vent for releasing the gas generated inside to the outside when the battery internal pressure rises to a predetermined valve operating level. The basic structure is the same as the safety mechanism 4 of the first embodiment. The safety mechanism 4 of the first embodiment uses a resealable safety vent 13 mainly composed of a valve element 12 made of an elastic material such as rubber, whereas, the resealable safety vent 46 in the safety mechanism 42 of the present embodiment uses a valve element 43 which is a rubber circular disc that works as an elastic closure plate for opening and closing the exhaust hole 11, in place of the rubber valve element 12 made of an elastic material. The valve element 43 is elastically pressed against the hole edge of the exhaust hole 11 in the molded sheet 5*a* using a compression coil spring 45.

This resealable safety vent 46 is configured to include the above-mentioned valve element 43 for sealing the exhaust hole 11, a support pin 44 with a retainer plate 44*b* at its end fixedly attached to the valve element 43, and a compression coil spring 45 that applies a force to the valve element 43 through the retainer plate 44*b* in a direction in which the valve element 43 is pressed against the hole edge of the exhaust hole 11 in the molded sheet 5*a*. The compression coil spring 45 is set around the pin 44*a* of the support pin 44, between the bottom of the retainer hole 16 and the retainer plate 44*b* of the support pin 44. The pin 44*a* of the support pin 44 has a smaller diameter than the compression coil spring 45 and can tilt relative to the compression coil spring 45. The compression coil spring 45 has a smaller diameter than the retainer hole 16 and can tilt relative to the hole 16.

Similarly to the first embodiment, on one side 14*a* of one of the two frames 14 (front side in the drawing) is further formed an exhaust passage 17, which is defined between both frames 14 by a recess that surrounds the retainer hole 16. This exhaust passage 17 has an opening 17*a* at the end face of one side 14*a* of the frame 14. Between the exhaust passage 17 and the retainer hole 16, a circular partition wall 23 is provided. The frame 14 of the other frame plate 3*b* is provided with a generally U-shaped, elastic exhaust passage forming component 18, with its part (lower end in the drawing) being fitted in a retainer groove 19 formed on the outer side of the circular partition wall 23. The exhaust passage forming component 18 is compressed between the outer surface of the protrusion 10 and one side 14*a* of the frame 14 by the pair of frames 14. Therefore the exhaust passage 17 is sealed except for its opening 17*a* so that, when the safety mechanism 42 is in an open state as will be described later, generated gas from the exhaust hole 11 is introduced through the exhaust passage forming component 18 to the opening 17*a*.

Figure 16A:
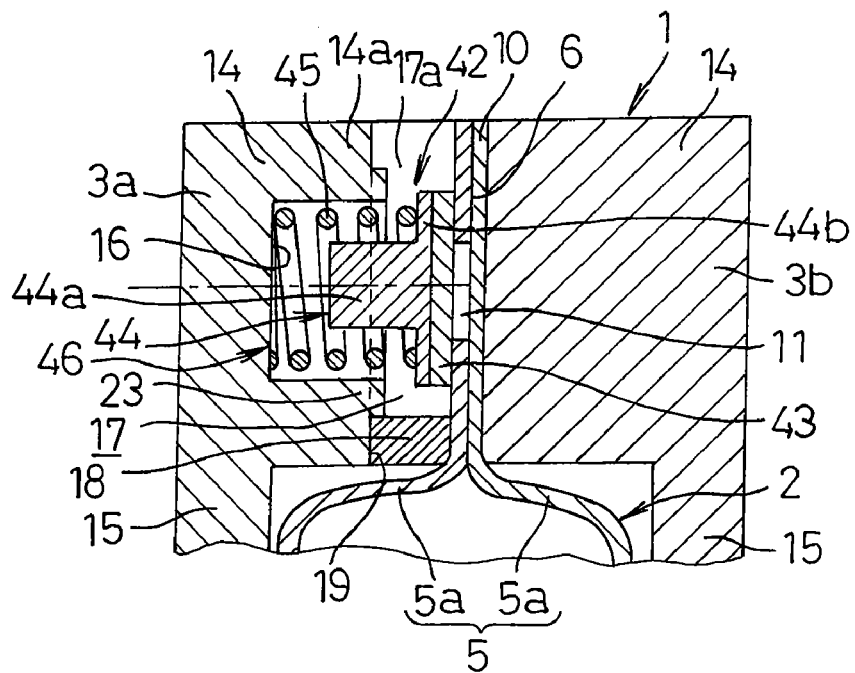
FIG. 16A and FIG. 16B are longitudinal cross-sectional views respectively illustrating the states before and after actuation of the vent in the above safety mechanism.

The pressure at which the vent is actuated in the safety mechanism 42 is determined by the spring constant and compression ratio of the compression coil spring 45. Similarly to the first embodiment, the valve operating pressure is preferably set from 0.4 to 0.7 MPa, and optimally about 0.5 MPa. The exhaust hole 11 is formed in the same position as the first embodiment. The exhaust hole 11, moreover, needs to have a diameter that can ensure release of a sufficient amount of gas to stop the pressure rise inside the exterior case 5. From a practical point of view, the amount of gas that needs to be released is about one to several hundreds cc/sec at the above valve operating pressure, and the diameter of the exhaust hole 11 of about 3 to 6 mm is enough for the purpose. On the other hand, the valve element 43 that seals the exhaust hole 11 preferably has a diameter that is twice or three times larger than that of the exhaust hole 11. A description will now be given of the action of the safety mechanism 42 with reference to FIG. 16A and FIG. 16B. When the pressure in the exterior case 5 of the laminate battery 2 is equal to or below the predetermined valve operating pressure (in the present embodiment 0.4 to 0.7 MPa), the compression coil spring 45 which is set and retained in the retainer hole 16 of the frame 14 with a predetermined compression ratio is pressing the valve element 43 through the retainer plate 44b of the support pin 44 so that the valve element 43 makes elastic pressure contact with the hole edge of the exhaust hole 11 in the protrusion 10 of the molded sheet 5a, thereby sealing the exhaust hole 11, as shown in FIG. 16A.

Figure 16B:
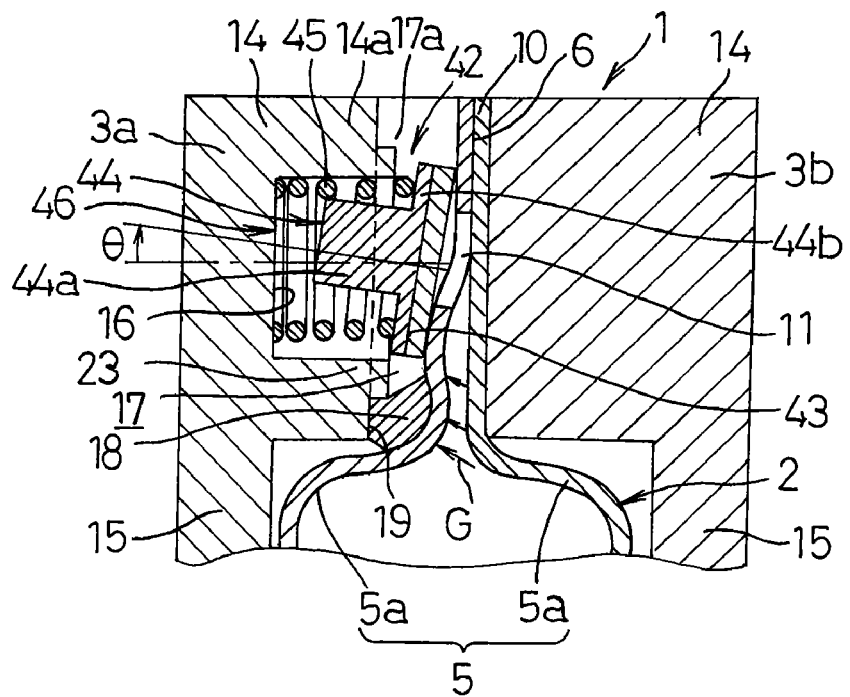

When the pressure in the exterior case 5 of the laminate battery 2 reaches the predetermined valve operating pressure, pressure of generated gas G that has flowed into the protrusion 10 causes the molded sheet 5a to expand outwardly, as well as causes compressive deformation of the elastic exhaust passage forming component 18, pushing the lower end in the drawing of the valve element 43 outwardly as shown in FIG. 16B. The pressure of generated gas G acting on the lower parts of the valve element 43 and the retainer plate 44b through the expanding molded sheet 5a causes the pin 44a to tilt at a certain angle θ, whereby the retainer plate 44b that is integral with the pin 44a and the valve element 43 attached to the retainer plate 44b are inclined at the same angle θ. Note, the pressure of generated gas G acts not only on the portion of the valve element 43 attached to the retainer plate 44b of the support pin 44 directly opposite the exhaust hole 11, but also on its entire end surface through the molded sheet 5a around the hole edge of the exhaust hole 11. Therefore, the safety mechanism 42 is actuated reliably when the internal pressure of the exterior case 5 has reached the predetermined valve operating level.

If the pressure build-up is a temporary one, the laminate battery 2 can be used further because a necessary amount of generated gas G has been released to lower the internal pressure to be equal to or below the valve operating pressure, at which time the compression coil spring 45 recovers its shape by its restoring force and the valve element 43 seals the exhaust hole 11 again.

The above safety mechanism 42 provides the following remarkable effects: While the compression coil spring 45 which is the main component of the resealable safety vent 46 suffers some deterioration through repeated compression cycles during a long-term use, if it is used in a high temperature atmosphere, it does not suffer high-temperature-induced deterioration and its spring properties remain more or less intact. Therefore, unlike the rubber valve element 12 which is susceptible to accelerated permanent distortion under high temperature, the safety mechanism 42 is usable in a wider range of temperatures stably with a constant valve operating pressure. The safety mechanism 42 is thus suitably used in relatively special applications, in particular a long-term use in a high temperature atmosphere, such as automobile applications.

In the safety mechanism 42, the valve operating pressure is determined by the spring constant and compression ratio of the compression coil spring 45. The smaller the spring constant of the compression coil spring 45 is, the less the valve operating pressure varies relative to variation of the compression ratio. For example, with a small spring constant of 12 N/mm, in order to set the valve operating pressure in a range of 0.5 to 0.7 MPa, the compression coil spring 45 needs to have a compression ratio in the range of 31 to 41%. Converted into length dimension, this compression ratio is 1 mm or less. In contrast, if the valve operating pressure is to be set within the same range using the rubber valve element 12 of the resealable safety vent 13 of the first embodiment, the compression ratio needs to be within the range of 8 to 10%, which, when converted into length dimension, is about 0.1 mm.

In other words, compression of the rubber valve element 12 in a length of 0.1 mm (equivalent to the compression ratio of about 2%) changes the valve operating pressure by as much as 0.17 MPa, while compression of the compression coil spring 45 of the above safety mechanism 42 in a length of 0.1 mm (equivalent to the compression ratio of about 1%) changes the valve operating pressure only by 0.04 MPa. This means that the elastic coefficient of the compression coil spring 45 can be chosen from a wider range than the rubber valve element 12, i.e., by choosing a compression coil spring 45 that has a suitable spring constant, a desired valve operating pressure can be achieved precisely without requiring high assembling precision. Thus the above safety mechanism 42 provides the merit of enabling a reduction in production cost.

Also, with the compression coil spring 45 of the above safety mechanism 42, a large valve operating pressure can be set with a smaller compression load as compared to the rubber valve element 12 of the first embodiment. The rubber valve element 12 is compressed and deformed in such a way that it is peeled off from one end by the pressing force from the molded sheet 5a that is expanding outwardly by the pressure of generated gas. Therefore the rubber valve element 12 needs to be compressed with a relatively large compression load. On the other hand, in the above safety mechanism 42, the gaps between the pin 44a of the support pin 44 and the compression coil spring 45 and between the spring 45 and the retainer hole 16 enable the support pin 44 to tilt, so that the resealable safety vent 46 is opened by the metal support pin 44 tilting when pressed by the molded sheet 5a that is expanding outwardly by the pressure of generated gas G. Therefore, with this safety mechanism configuration, a relatively large valve operating pressure can be achieved with a small compression load that is applied to the compression coil spring 45.

The following are some actual measurement examples of the above: The rubber valve element 12 needs to be compressed with a compression load of about 12 kgf to achieve a valve operating pressure of 0.7 MPa with the safety vent 13 of the first embodiment. On the other hand, the compression coil spring 45 needs to be compressed with a compression load of about 6 kgf to achieve a valve operating pressure of 0.7 MPa with the above safety mechanism 42. As the pair of frame plates 3a and 3b that function as the holder of the safety mechanism 42 do not require high rigidity, the frame plates can be made smaller and lighter accordingly.

INDUSTRIAL APPLICABILITY

As described above, according to the safety mechanism for laminate batteries of the present invention, the safety vent operates at a low pressure with small variation in the pressure at which it operates, i.e., with high precision in the valve operating pressure. Therefore the safety vent does not operate within the range of internal pressure variation during normal use while being capable of operating reliably at the predetermined valve operating pressure, which is set within the safe range of pressure relative to the strength of the exterior case. With the exhaust hole being formed in a position where the distance between the hole and the inner edge of the bonded part on the protruded side of the protrusion is 1.5 mm or less, the safety vent is capable of operating precisely and reliably at a time point when the predetermined valve operating pressure is reached. Moreover, with the use of a safety vent in which the valve element is pressed with a spring, the initial valve operating pressure can be maintained stably for a long period of time, and also, a desired valve operating pressure can be set with a relatively low assembling load without requiring high assembling precision. Therefore the safety mechanism is suitably applicable to laminate batteries that are used as the drive power source of various equipment.

The invention claimed is:

1. A safety mechanism for a laminate battery, the battery comprising power generation elements and an electrolyte both accommodated in an exterior case, the exterior case being formed by superposing two molded sheets made of laminate sheets upon one another and bonding them together around outer edges, thereby forming a bonded part,
wherein the exterior case is provided with a projection that communicates with an internal space of the exterior case and protrudes outwardly from one side of the exterior case;
wherein the safety mechanism includes a safety vent having an exhaust hole formed in at least one of the two molded sheets in the projection, and a valve element that seals the exhaust hole by making elastic pressure contact with a hole edge of the exhaust hole; and an exhaust passage forming component that guides gas from the exhaust hole to the outside, said exhaust hole having an upper edge;
wherein part of the exterior case where the internal space accommodating the power generation elements communicates with the exhaust hole is not heat-sealed; and
wherein the exhaust hole is positioned such that a distance between the upper edge of the exhaust hole and an inner edge of the bonded part relative to the outer edge of the projection on the protruded side of the exterior case is 1.5 mm or less.

2. The safety mechanism for a laminate battery according to claim 1, wherein the exhaust hole is positioned such that a distance between the upper edge of the exhaust hole and an inner edge of the bonded part of the protrusion on the protruded side is 1.0 mm or less.

3. The safety mechanism for a laminate battery according to claim 1, wherein the valve element is formed from an elastic material.

4. The safety mechanism for a laminate battery according to claim 3, wherein the valve element is made of an elastic material having rubber elasticity.

5. The safety mechanism for a laminate battery according to claim 4, wherein EPDM is used as the material having rubber elasticity.

6. The safety mechanism for a laminate battery according to claim 4, wherein an EPDM/urethane double layer is used as the material having rubber elasticity.

7. The safety mechanism for a laminate battery according to claim 3, wherein the valve element is set in a compressed state with a compression ratio of 25% or less.

8. The safety mechanism for a laminate battery according to claim 1, wherein the safety vent is configured to be resealable, in which the valve element, making elastic pressure contact with a hole edge of the exhaust hole in the projection of the molded sheet to seal the exhaust hole, is elastically deformed when the internal pressure of the laminate battery rises to a predetermined level, thereby opening the vent, and after that, when the internal pressure lowers to a predetermined level, the valve element returns to the initial shape, thereby closing the vent.

9. The safety mechanism for a laminate battery according to claim 8, wherein the resealable safety vent is configured to operate at a valve operating pressure of 0.4 to 0.7 MPa, the valve operating pressure being reproducible with a tolerance range of variation in valve operating pressure being ±0.05 MPa.

10. The safety mechanism for a laminate battery according to claim 1, wherein the exhaust hole is formed in the protrusion in both of the two molded sheets at matching positions, and the pair of exhaust holes are respectively sealed with valve elements making pressure contact with the hole edges to provide a pair of safety vents.

11. The safety mechanism for a laminate battery according to claim 1, wherein an electrolyte resistant layer having high corrosion resistance against the electrolyte is provided on a surface of the valve element of the safety vent or between the valve element and the molded sheet that makes contact therewith.

12. The safety mechanism for a laminate battery according to claim 11, wherein a material having a lower water permeability and good chemical resistance is used as the electrolyte resistant layer.

13. The safety mechanism for a laminate battery according to claim 1, comprising: a pair of frame plates that compress at least the bonded part around an outer edge of the laminate battery from both sides;
a retainer provided in part of the pair of frame plates for retaining the valve element; and
an exhaust passage that surrounds the retainer to form a gas introducing space around the valve element, the space communicating with an opening in the end face of the pair of frame plates.

14. The safety mechanism for a laminate battery according to claim 13, wherein the exhaust passage is formed using an exhaust passage forming component made of an elastic material in the shape that forms the gas introducing space between itself and the periphery of the valve element, the component being held between the frame plate and the other of the two molded sheets.

15. The safety mechanism for a laminate battery according to claim 14, wherein the exhaust passage forming component includes an integrally formed opening-formation portion that surrounds the opening of the exhaust passage.

16. The safety mechanism for a laminate battery according to claim 13, comprising an exhaust duct connected in communication with the opening of the exhaust passage in the end face of the frame plate for releasing the gas that has flowed through the exhaust passage into a predetermined direction.

17. The safety mechanism for a laminate battery according to claim 13, comprising a restricting plate integrally or separately provided to the frame plate so as to prevent expansive deformation of the laminate battery, the restricting plate being abutted on both sides of a single laminate battery, or, on respective outer face of at least two laminate batteries arranged at both ends of a plurality of laminate batteries arranged in parallel in a thickness direction.

18. The safety mechanism for a laminate battery according to claim 1, wherein the safety vent is configured to include an exhaust hole formed in the protrusion in one of the molded sheets;
a valve element making elastic pressure contact with the hole edge of the exhaust hole to seal the hole; and
a protection sheet bonded to a portion of the protrusion opposite the exhaust hole on an inner face of the other of the two molded sheets.

19. The safety mechanism for a laminate battery according to claim 1, wherein the safety vent is configured to be resealable, in which the valve element is made up of a spring retained in a pair of frame plates that hold the projection securely from both sides, and a closure plate pressed by the spring to make elastic pressure contact with the hole edge of the exhaust hole to seal the hole.

20. The safety mechanism for a laminate battery according to claim 19, wherein a support pin is provided, at one end of which the valve element is securely attached;

the spring is interposed between the valve element and a retainer hole in the frame plate so as to surround the support pin; and a gap that allows the support pin to tilt is provided at least one of between the support pin and the spring and between the spring and a hole edge of the retainer hole.

* * * * *